(12) United States Patent
Sayama

(10) Patent No.: US 9,091,105 B2
(45) Date of Patent: Jul. 28, 2015

(54) OPENING/CLOSING DEVICE

(75) Inventor: Hironobu Sayama, Ichihara (JP)

(73) Assignee: MITSUBISHI STEEL MFG. CO., LTD., Tokyo (JP)

( * ) Notice: Subject to any disclaimer, the term of this patent is extended or adjusted under 35 U.S.C. 154(b) by 104 days.

(21) Appl. No.: 13/821,689

(22) PCT Filed: May 26, 2011

(86) PCT No.: PCT/JP2011/062129
§ 371 (c)(1),
(2), (4) Date: Mar. 8, 2013

(87) PCT Pub. No.: WO2012/032815
PCT Pub. Date: Mar. 15, 2012

(65) Prior Publication Data
US 2013/0160244 A1    Jun. 27, 2013

(30) Foreign Application Priority Data

Sep. 10, 2010 (JP) .................................. 2010-203383
Apr. 21, 2011 (JP) .................................. 2011-094892

(51) Int. Cl.
*E05D 3/06* (2006.01)
*E05D 3/18* (2006.01)
(Continued)

(52) U.S. Cl.
CPC .............. *E05D 3/18* (2013.01); *E05D 11/1014* (2013.01); *G06F 1/1681* (2013.01); *H04M 1/0237* (2013.01); *E05Y 2900/606* (2013.01); *H04M 1/0216* (2013.01); *Y10T 16/5476* (2015.01)

(58) Field of Classification Search
CPC .............. E05D 5/00; E05D 5/06; E05D 5/18; E05D 5/16; E05D 7/06; E05D 2003/06; G06F 1/1681; H04M 1/0237; H04M 1/0216; H04M 1/0227

USPC .......... 16/366, 368, 370, 357, 362, 363, 287, 16/288; 49/246, 248, 229, 245, 208, 226, 49/232
See application file for complete search history.

(56) References Cited

U.S. PATENT DOCUMENTS 2,001,356 A * 5/1935 Bates ............................. 16/358
2,206,708 A * 7/1940 Stumpf ......................... 16/358
(Continued)

FOREIGN PATENT DOCUMENTS

JP      64-042671 U       3/1989
JP      2005-303926       10/2005
(Continued)

OTHER PUBLICATIONS

International Search Report mailed on Aug. 2, 2011.

*Primary Examiner* — Emily Morgan
(74) *Attorney, Agent, or Firm* — IPUSA, PLLC

(57) ABSTRACT

An opening/closing device includes an opening/closing mechanism which moves a movable plate between an opened position and a closed position including a hinge arm including a first axial portion rotatably connected to the fixed plate, a third axial portion rotatably connected to the movable plate, and a slide groove provided between the first axial portion and the third axial portion, and capable of moving the movable plate between the closed position and the opened position with respect to the fixed plate by being rotated around the first axial portion as a center, a link arm including a second axial portion rotatably connected to the fixed plate and a fifth axial portion slidably connected to the slide groove, and a slide arm including a fourth axial portion rotatably connected to the movable plate at an end portion and connected to the fifth axial portion at the other end portion.

8 Claims, 19 Drawing Sheets

(51) Int. Cl.
*E05D 11/10* (2006.01)
*G06F 1/16* (2006.01)
*H04M 1/02* (2006.01)

(56) References Cited

U.S. PATENT DOCUMENTS

| | | | | |
|---|---|---|---|---|
| 4,475,267 | A * | 10/1984 | Hathaway | 16/288 |
| 7,178,202 | B2 * | 2/2007 | Hirtsiefer et al. | 16/366 |
| 7,748,767 | B2 * | 7/2010 | Terhaar et al. | 296/100.06 |
| 8,250,712 | B2 * | 8/2012 | Kim et al. | 16/367 |
| 8,256,064 | B2 * | 9/2012 | Blersch et al. | 16/286 |
| 8,353,083 | B2 * | 1/2013 | Wu et al. | 16/362 |
| 8,468,655 | B2 * | 6/2013 | Borkgren et al. | 16/348 |
| 8,769,773 | B2 * | 7/2014 | Katsuta | 16/362 |
| 2007/0058329 | A1 * | 3/2007 | Ledbetter et al. | 361/681 |
| 2008/0100087 | A1 * | 5/2008 | Terhaar et al. | 296/100.06 |
| 2009/0011802 | A1 | 1/2009 | Malthe et al. | |
| 2009/0061963 | A1 | 3/2009 | Miyaoka | |
| 2010/0188350 | A1 | 7/2010 | Sawada | |
| 2011/0258811 | A1 * | 10/2011 | Borkgren et al. | 16/319 |
| 2012/0192381 | A1 * | 8/2012 | Zhang et al. | 16/366 |
| 2013/0192140 | A1 * | 8/2013 | Sayama | 49/386 |

FOREIGN PATENT DOCUMENTS

| | | |
|---|---|---|
| JP | 2008-533887 | 8/2008 |
| JP | 2008-271027 | 11/2008 |
| JP | 2009-059102 | 3/2009 |
| JP | 2009-071588 | 4/2009 |
| JP | 2009-218674 | 9/2009 |
| WO | WO 2008101666 A2 * | 8/2008 |

* cited by examiner

FIG.10
(A)
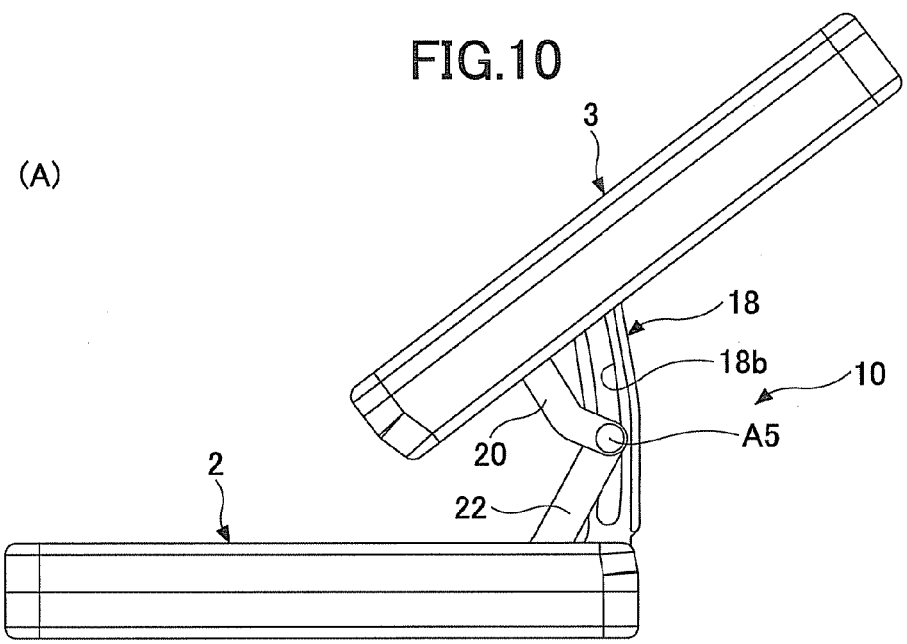
(B)
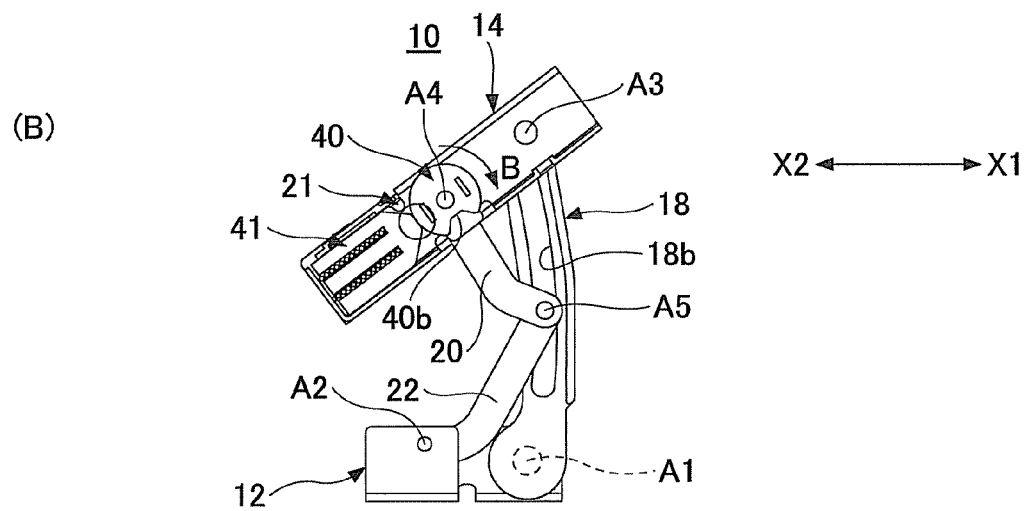
(C)
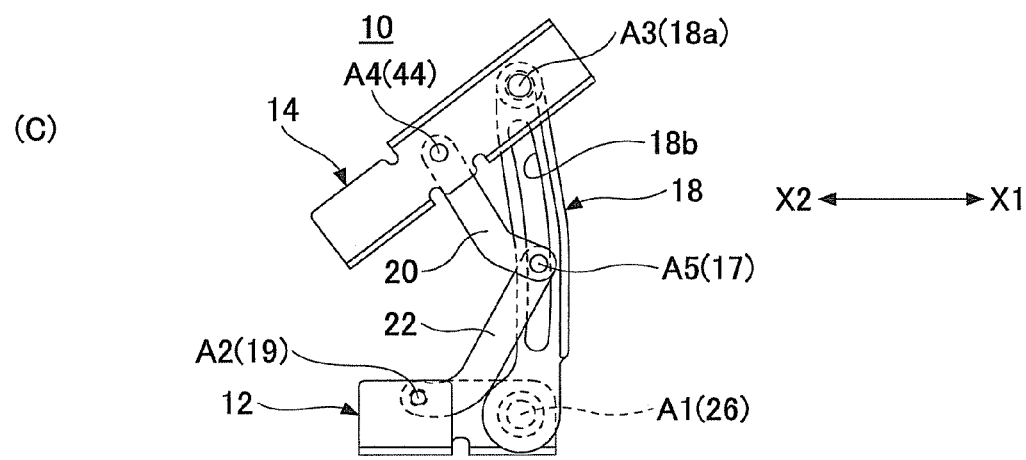

FIG.11
(A)
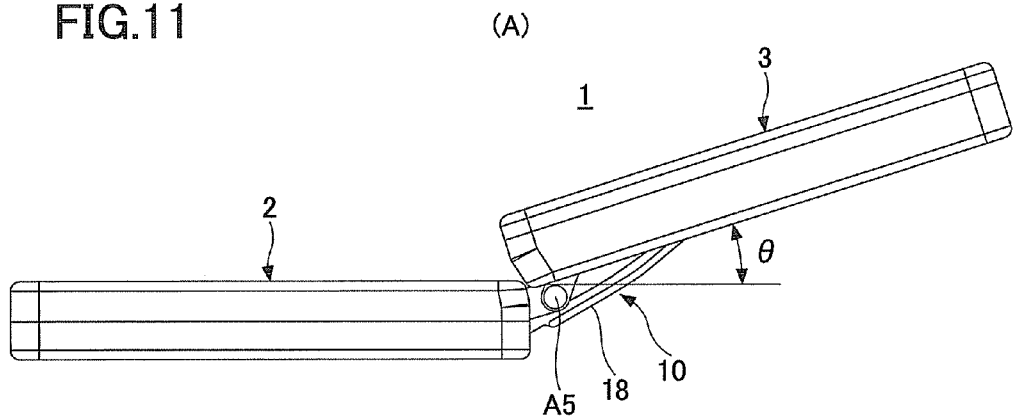
(B)
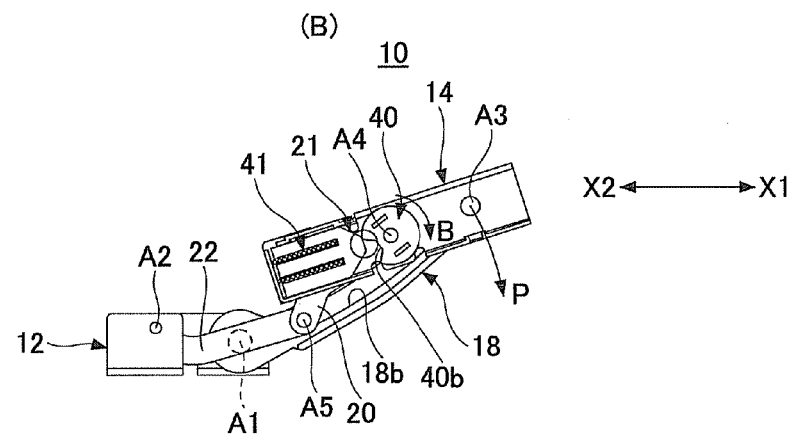
(C)
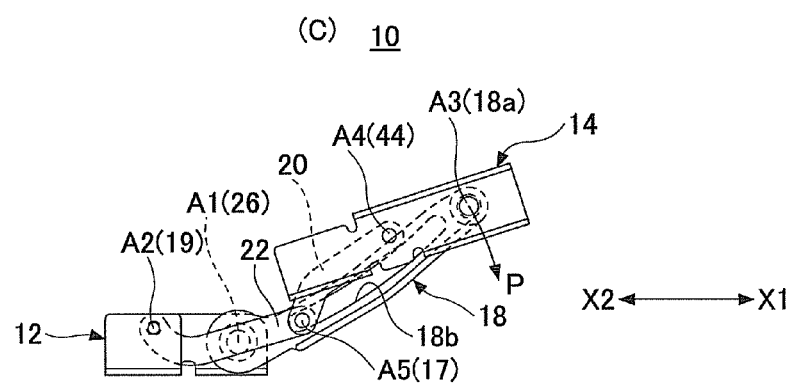

FIG.13
(A)
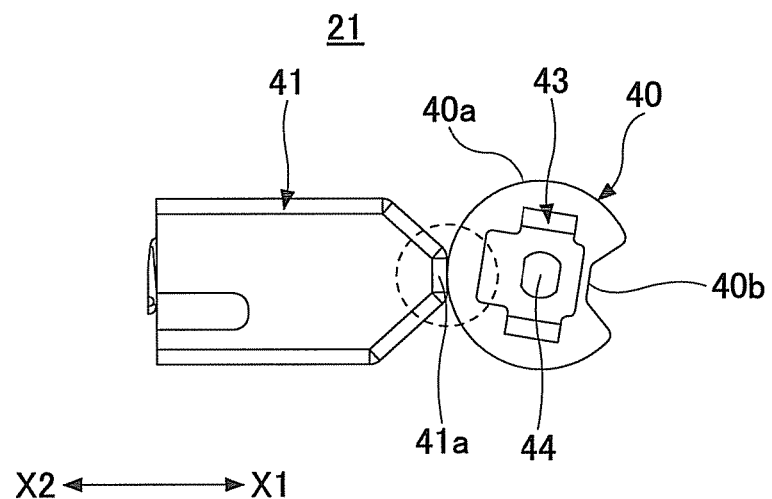
(B)
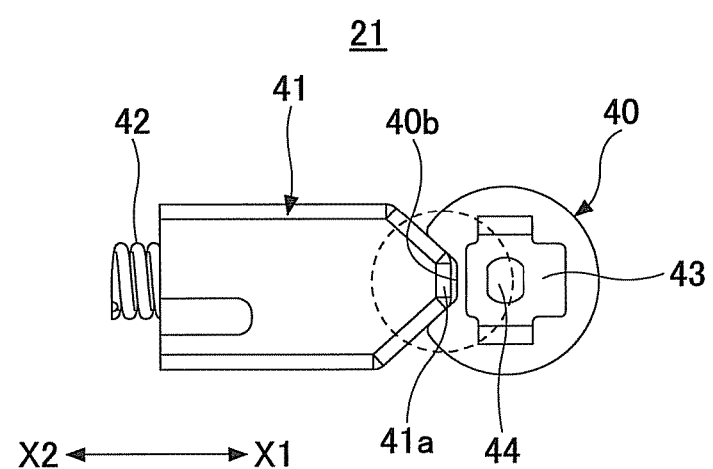

FIG.14
(A)
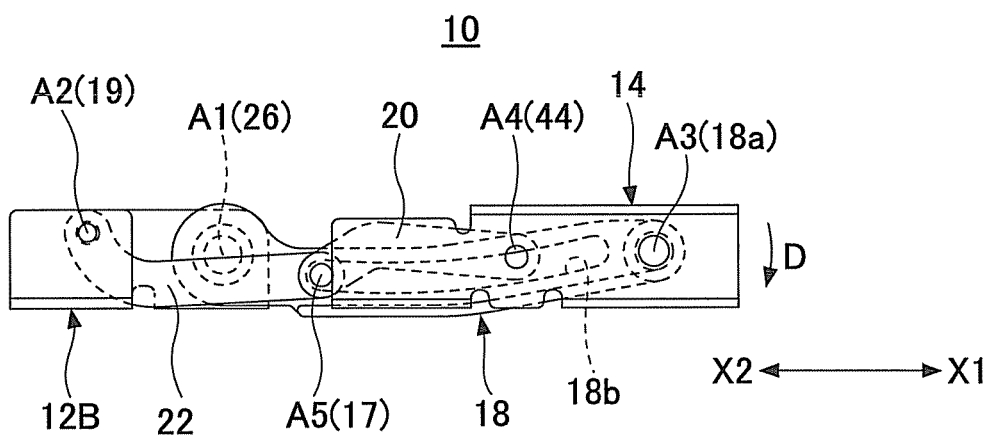
(B)
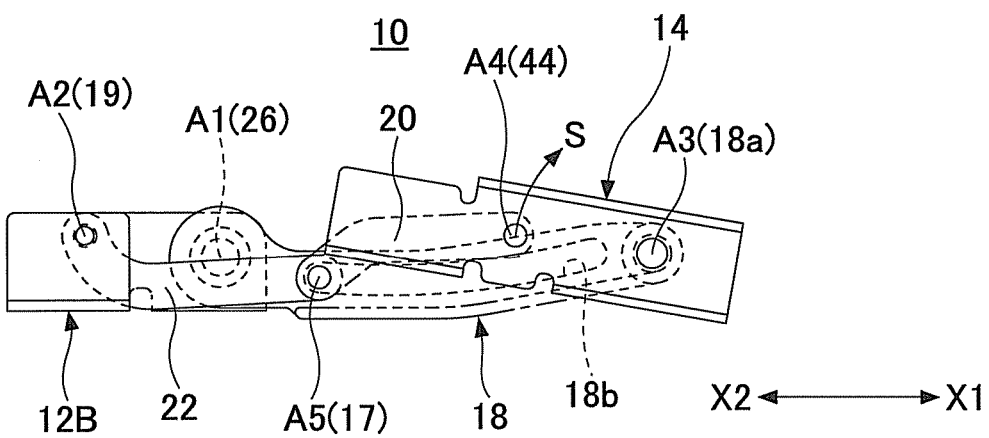

FIG.18
(A)
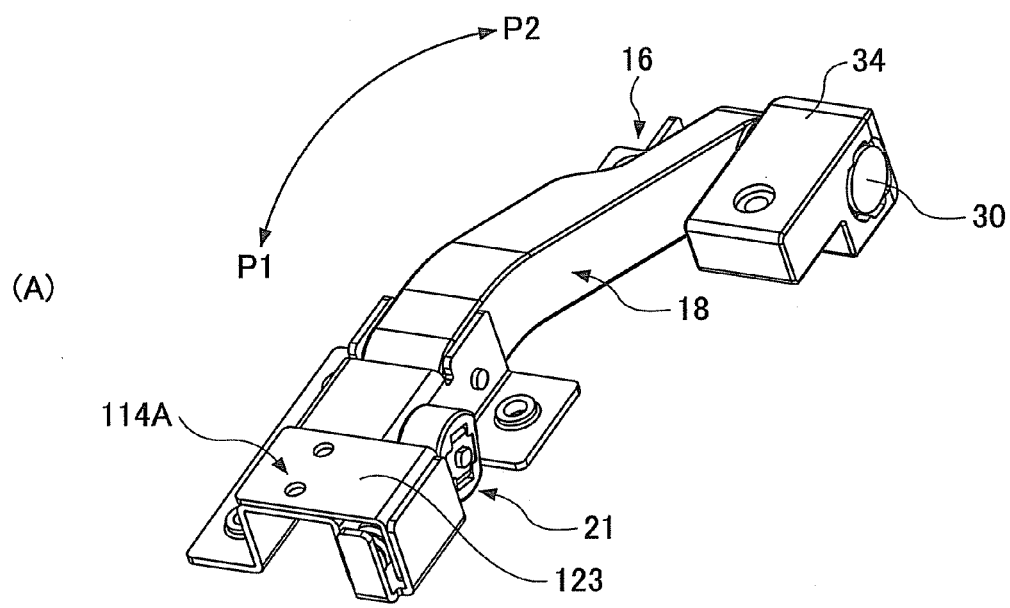
(B)
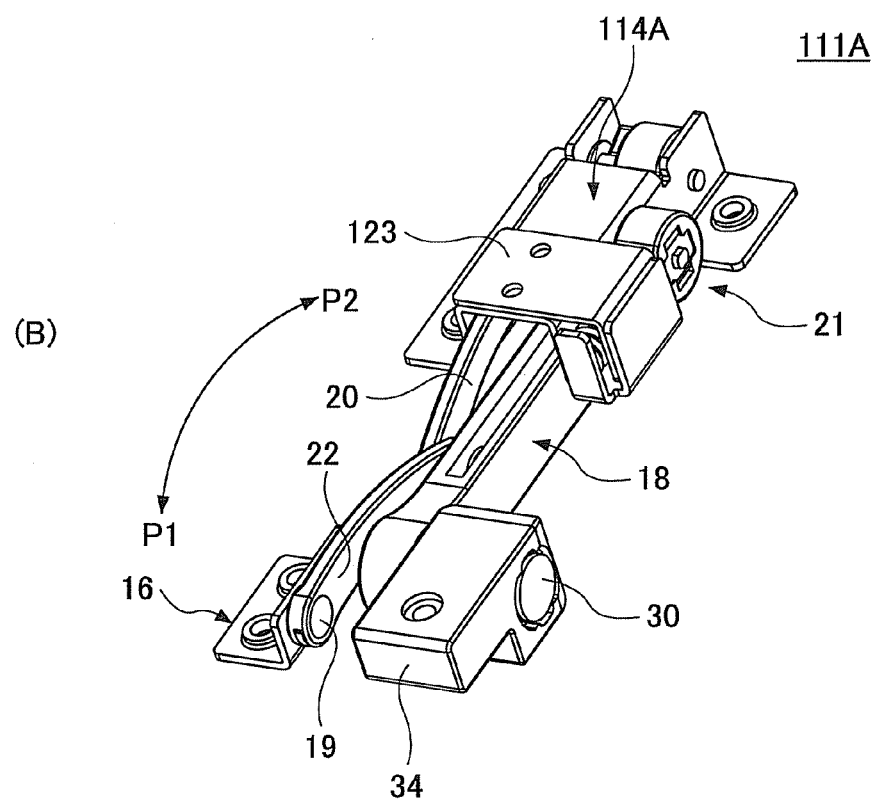

FIG.19
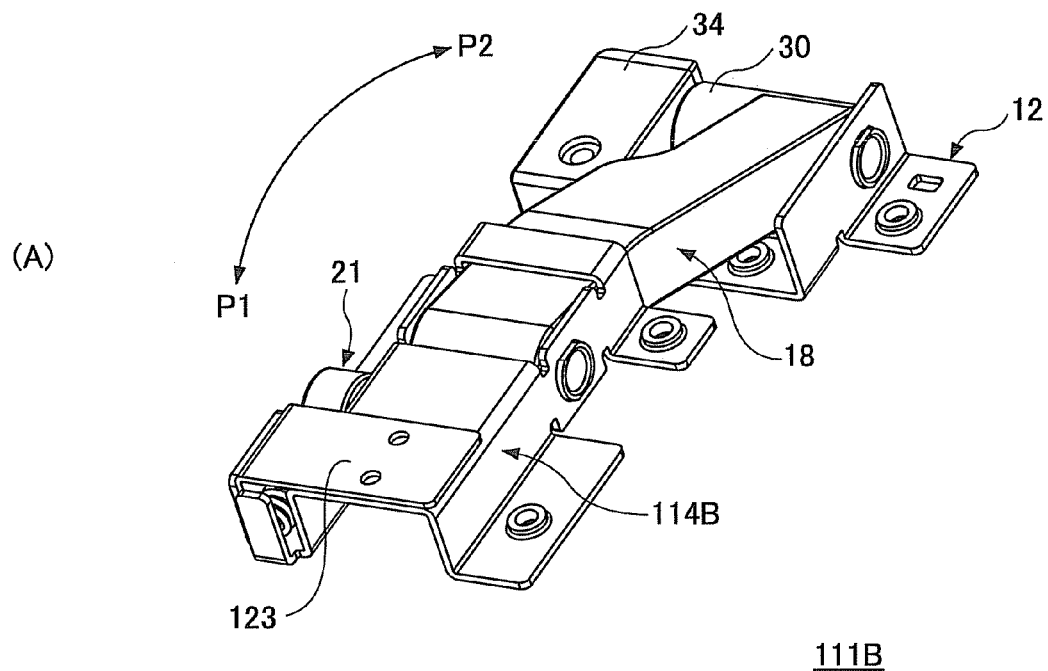
(A)
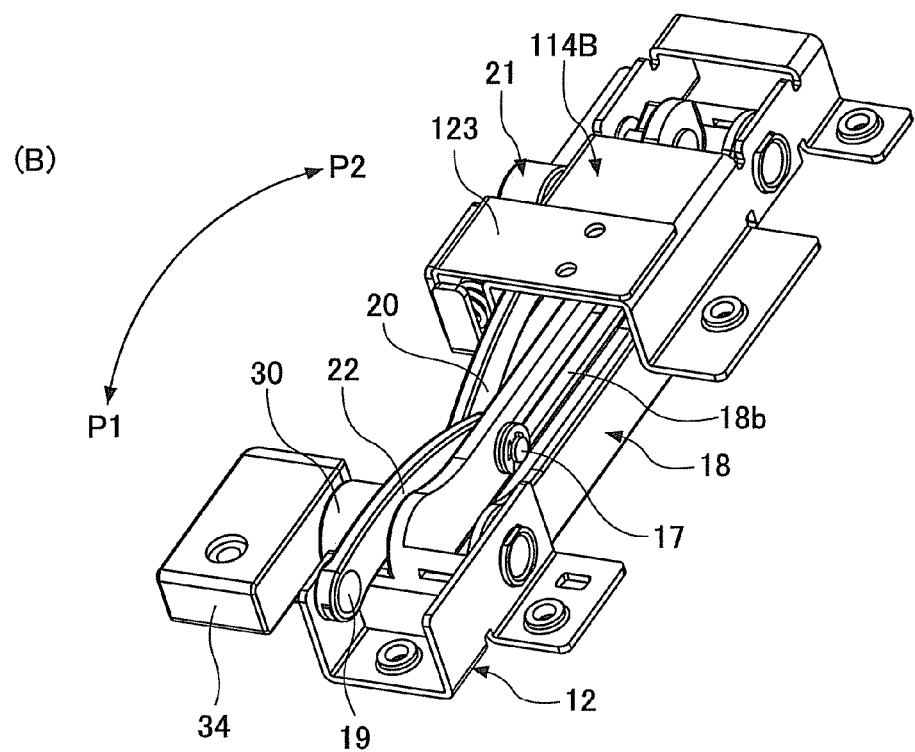
(B)

OPENING/CLOSING DEVICE

BACKGROUND OF THE INVENTION

1. Field of the Invention

The present invention relates to an opening/closing device and more specifically, to an opening/closing device which moves a movable plate with respect to a fixed plate.

2. Description of the Related Art

Generally, a mobile terminal device includes a first housing to which a numeric keypad, a liquid crystal display device or the like is provided and a second housing to which a liquid crystal display device or the like is provided and capable of being opened and closed with respect to the first housing. Further, as a structure which opens and closes the second housing with respect to the first housing, a folding type in which the first housing and the second housing are connected by a hinge mechanism so that the second housing is rotated with respect to the first housing and a slide type in which the second housing is slid with respect to the first housing are generally used.

Recently, a mobile terminal device has been progressed to have a multifunction, there is provided a device which is capable of receiving Digital Terrestrial Television Broadcasting and the size of the liquid crystal display device has been enlarged. Further, in accordance with providing the multifunction, the number of keys of the keyboard for performing an input process to the mobile terminal device tends to increase so that the size of the keyboard is becoming larger. On the other hand, for the mobile terminal device, improvement of the portability is always desired so that there is a limitation in enlarging the size of the liquid crystal display device and the keyboard.

For the above described folding type mobile terminal device, when the device is folded, the liquid crystal display device is closed so that there is a problem that the liquid crystal display device cannot be used in the folded state. Further, for the slide type mobile terminal device, although the same problems of the folding type do not occur, there is inevitably an overlapping between the first housing and the second housing at an opened state so that space cannot be efficiently used.

Thus, an opening/closing device at which the first housing and the second housing are positioned at the same plane (flat) when the first housing and the second housing are opened has been suggested (see Patent Documents 1 to 3). With this structure, the liquid crystal display device can be used even when the first housing and the second housing are closed, and there is no overlapping between the first housing and the second housing when they are opened to efficiently use a space.

PATENT DOCUMENT

[Patent Document 1] Japanese Laid-open Patent Publication No. 2009-218674

[Patent Document 2] Japanese Laid-open Patent Publication No. 2009-059102

[Patent Document 3] Japanese Laid-open Patent Publication No. 2009-071588

However, the opening/closing device disclosed in Patent Document 1 is configured such that the second housing is moved with respect to the first housing by a single arm. As such, the second housing is arbitrarily rotated during the movement so that the moving operation is unstable.

Further, in the opening/closing device disclosed in Patent Document 2 or 3, as it is necessary to perform two kinds of operations including a slide operation in which the second housing is slid with respect to the first housing and an elevating operation in which the second housing is moved in the upper and lower direction with respect to the first housing when performing an open and close operation, the open and close operation is troublesome.

SUMMARY OF THE INVENTION

The present invention is made in light of the above problems, and provides an opening/closing device capable of performing a movement operation of a movable plate with respect to a fixed plate stably and smoothly by a single operation.

According to an embodiment, there is provided an opening/closing device including an opening/closing mechanism which moves a movable plate between an opened position and a closed position with respect to a fixed plate, the opening/closing mechanism including a hinge arm including a first axial portion rotatably connected to the fixed plate, a third axial portion rotatably connected to the movable plate, and a slide groove provided between the first axial portion and the third axial portion, and capable of moving the movable plate between the closed position and the opened position with respect to the fixed plate by being rotated around the first axial portion as a center, a link arm including a second axial portion rotatably connected to the fixed plate and a fifth axial portion slidably connected to the slide groove, and a slide arm including a fourth axial portion rotatably connected to the movable plate at an end portion and connected to the fifth axial portion at the other end portion, and wherein when the movable plate is moved between the closed position and the opened position, the fifth axial portion is slid in the slide groove in accordance with rotations of the hinge arm and the link arm, and surfaces of the first housing and the second housing are positioned at substantially the same plane when the movable plate is moved to the opened position.

According to the embodiment, as one end portions of a slide arm and a link arm synchronously move with a rotation of a hinge arm when a fifth axial portion moves within a slide groove in accordance with the rotation of the hinge arm, a movable plate can be smoothly moved between the closed position and the opened position by a single operation.

BRIEF DESCRIPTION OF THE DRAWINGS

Other objects, features and advantages of the present invention will become more apparent from the following detailed description when read in conjunction with the accompanying drawings.

FIG. 10 is a schematic structure view for explaining the operation of the opening/closing device of the embodiment (part 3), where (A) is a side view of the electronic device, (B) is a side view of the opening/closing device to which the backlash prevention mechanism is attached, and (C) is a side view of the opening/closing device where the backlash prevention mechanism is detached;

FIG. 11 is a schematic structure view for explaining the operation of the opening/closing device of the embodiment (part 4), where (A) is a side view of the electronic device, (B) is a side view of the opening/closing device to which the backlash prevention mechanism is attached, and (C) is a side view of the opening/closing device where the backlash prevention mechanism is detached;

FIG. 13 is a view for explaining the operation of the backlash prevention mechanism, where (A) shows a state in which a latch is pressed in contact with a circumference portion of a latch cam, and (B) shows a state in which a protruding portion of the latch engages a cam portion of the latch cam;

FIG. 14 is a view for explaining the function of the backlash prevention mechanism, where (A) shows a state in which backlash is not generated, and (B) shows a state in which backlash is generated;

FIG. 18 is a perspective view for explaining an operation of the hinge arm positioned at right side in FIG. 15, where (A) shows the closed state and (B) shows the opened state;

FIG. 19 is a perspective view for explaining the operation of the hinge arm positioned at left side in FIG. 15, where (A) shows the closed state, and (B) shows the opened state.

DETAILED DESCRIPTION OF THE PREFERRED EMBODIMENTS

The embodiment is explained with reference to FIG. 1 to FIG. 19.

Figure 1:
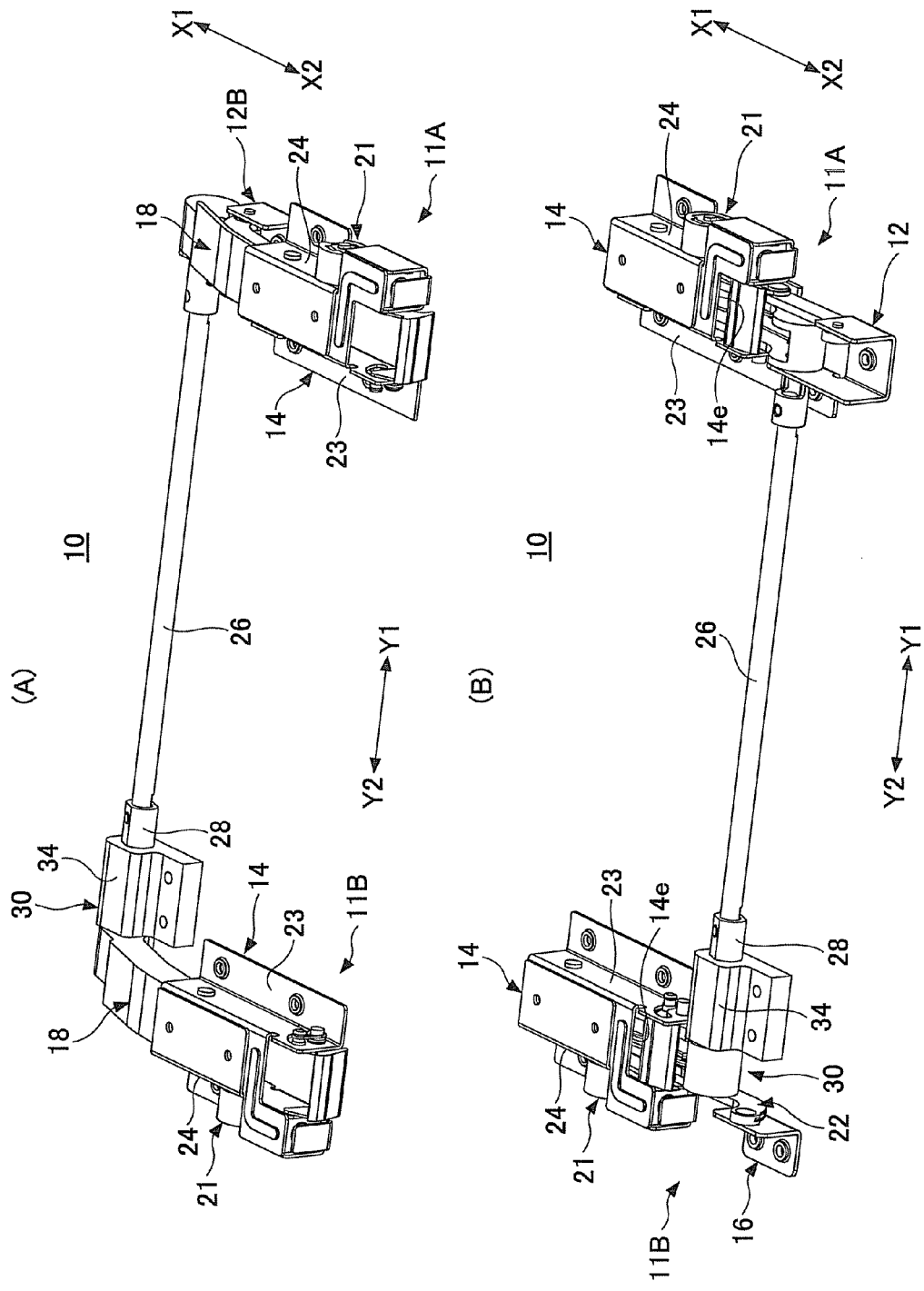
FIG. 1 is a perspective view of an opening/closing device of an embodiment, where (A) shows a state in which a movable plate is at a closed state, and (B) shows a state in which the movable plate is at an opened state.
Figure 2:
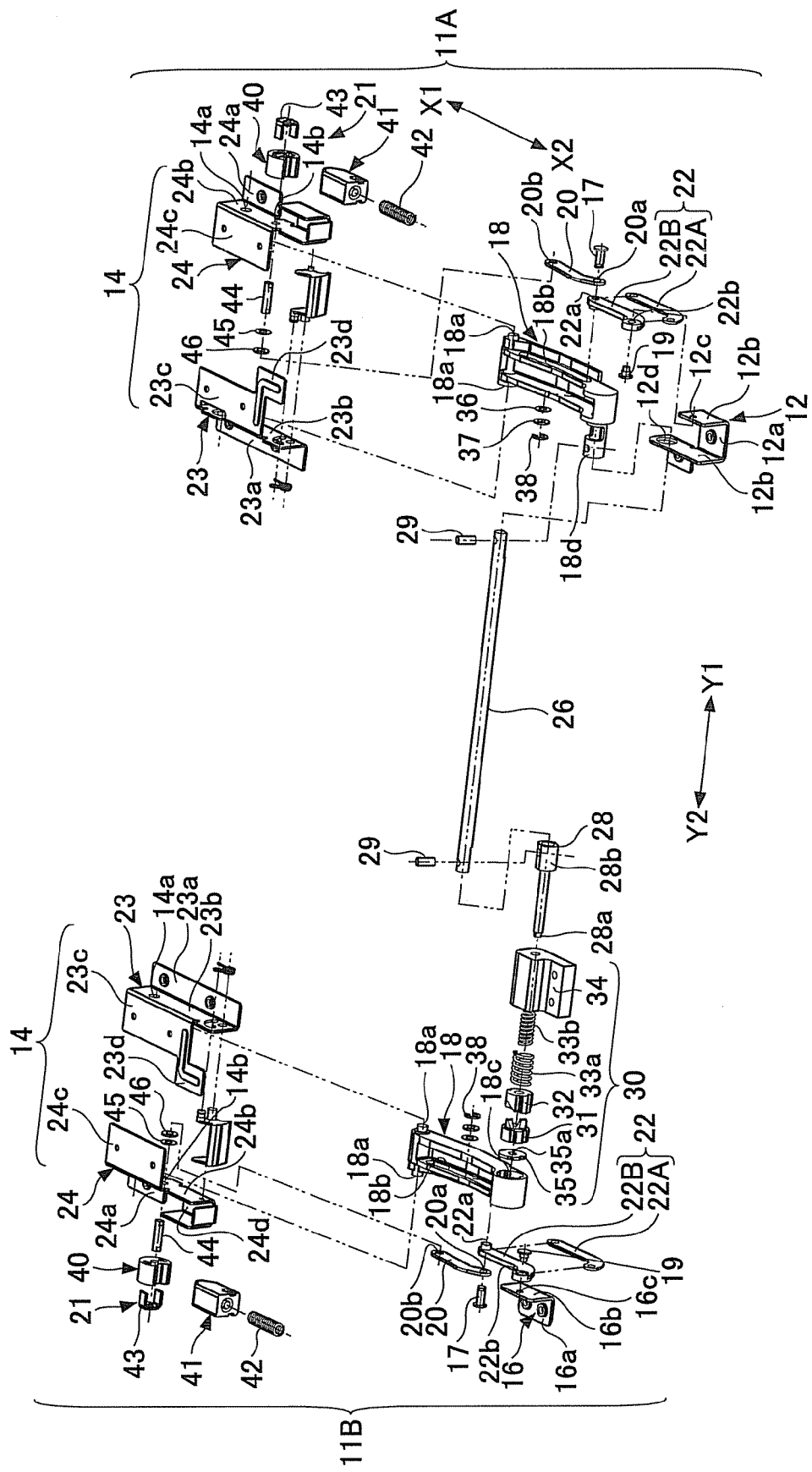
FIG. 2 is an exploded perspective view of the opening/closing device of the embodiment.
Figure 3:
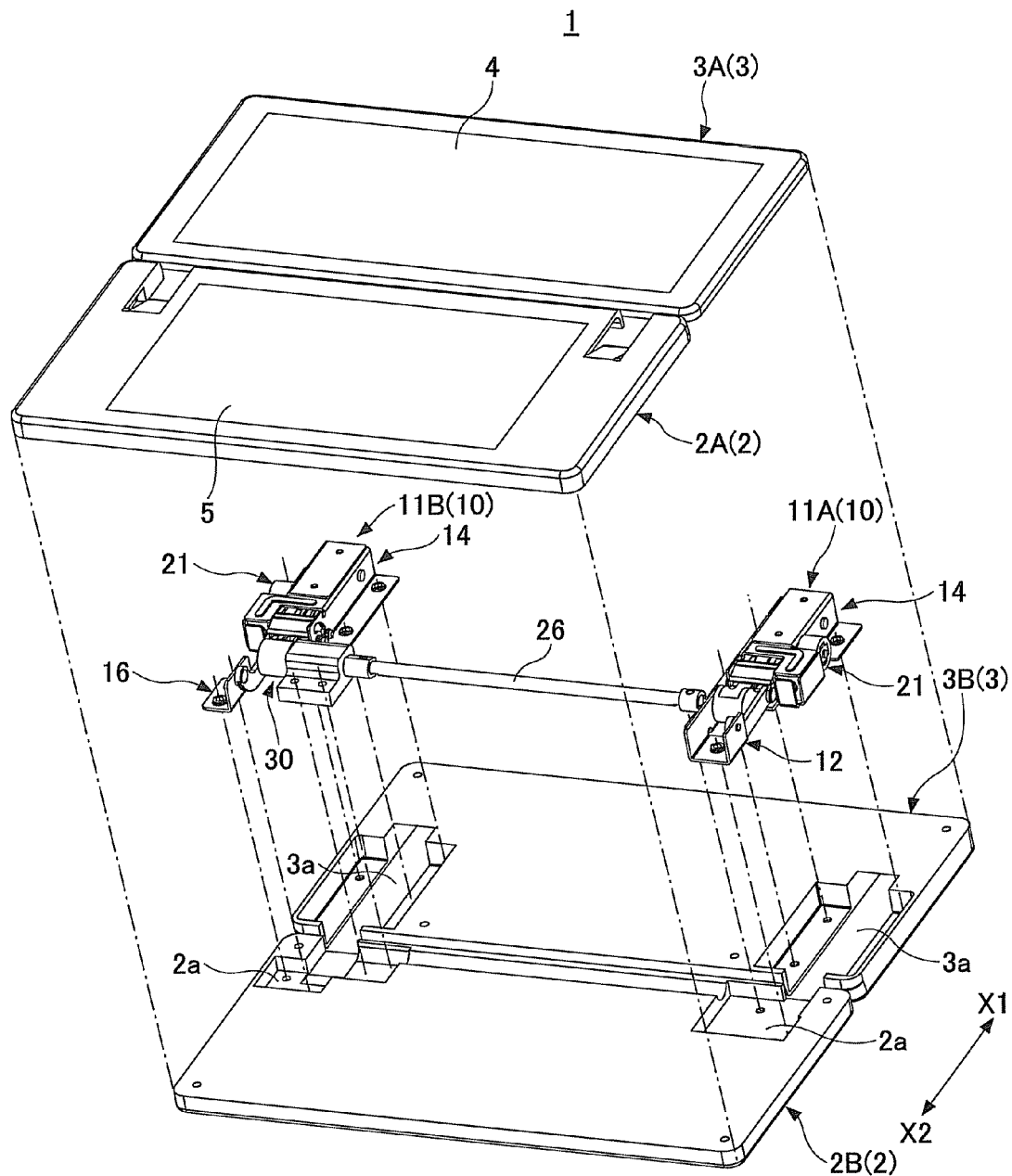
FIG. 3 is an exploded perspective view for explaining an attachment of the opening/closing device of the embodiment to an electronic device.
Figure 4:
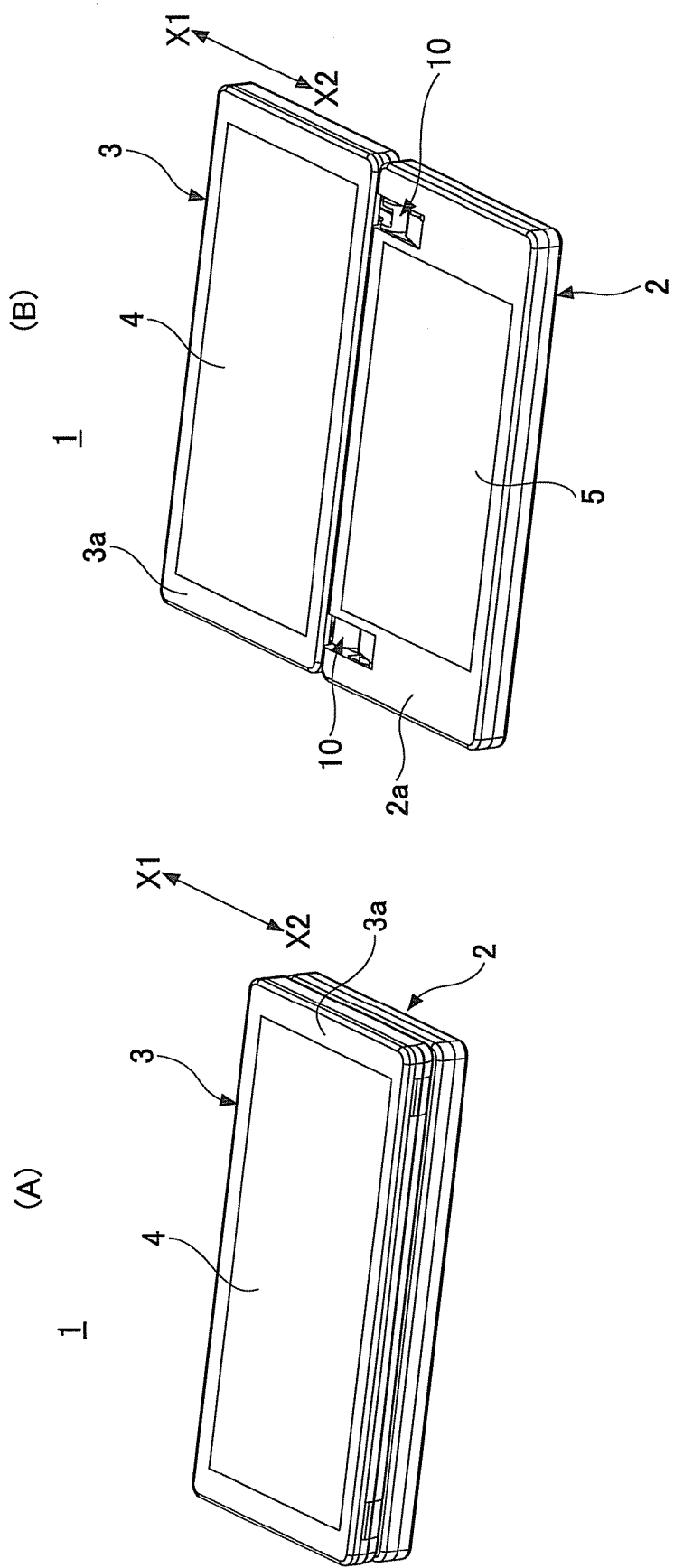
FIG. 4 is a perspective view of an electronic device to which the opening/closing device of the embodiment is attached where (A) shows the closed state, and (B) shows the opened state.

FIG. 1 and FIG. 2 are views for explaining an opening/closing device 10 of the embodiment, while FIG. 3 and FIG. 4 are views for explaining an electronic device 1 in which the opening/closing device 10 is provided.

As shown in FIG. 4, the electronic device 1 is, for example, a mobile terminal device and includes a first housing 2, a second housing 3, the opening/closing device 10 and the like. A keyboard 5 or the like is provided at an upper surface 2a of the first housing 2. Here, although it is possible to provide a liquid crystal display device or the like at the upper surface 2a of the first housing 2, in this embodiment, an example where the keyboard is provided is explained. Further, a liquid crystal display device 4 or the like is provided at an upper surface 3a of the second housing 3.

For the mobile terminal device, it is necessary to improve portability by downsizing the shape when carrying the device. Thus, for the electronic device 1 of the embodiment, the second housing 3 is movable with respect to the first housing 2 between a closed position and an opened position by providing the opening/closing device 10.

In FIG. 4, (A) shows a state at which the second housing 3 is positioned at the closed position (hereinafter, referred to as a "closed state"), and (B) shows a state at which the second housing 3 is positioned at the opened position (hereinafter, referred to as an "opened state"). The second housing 3 overlaps above the first housing 2 at the closed state and thus only the liquid crystal display device 4 is exposed at the surface 3a. Therefore, it is possible to see the liquid crystal display device 4 from outside even at the closed state.

Further in this embodiment, the first housing 2 and the second housing 3 have the same shape in a plan view and thus the area of the electronic device 1 at the closed state becomes a half of the area of which it is at the opened state in a plan view. Therefore, the electronic device 1 becomes a small size and portability is retained at the closed state.

On the other hand, at the opened state, as will be explained later in detail, the second housing 3 moves from the closed position to the opened position by a rotation of a hinge arm 18, a slide arm 20, a link arm 22 and the like (see FIG. 2) composing the opening/closing device 10 to be a state in which the upper surface 2a of the first housing 2 and the upper surface 3a of the second housing 3 are positioned at the same plane. As shown in (B) of FIG. 4, the first housing 2 and the second housing 3 do not overlap and are positioned to be in a state in which the housings are laterally disposed on the same plane at the opened state.

The entire surfaces of the upper surfaces 2a and 3a of the housings 2 and 3, respectively, are exposed upward at the opened state. Thus, the entirety of the upper surface 2a of the first housing 2 can be used as an area for mounting structural components of the electronic device 1, and similarly, the entirety of the upper surface 3a of the second housing 3 can be used as an area for mounting the structural components of the electronic device 1.

As such, according to the electronic device 1 provided with the opening/closing device 10 of the embodiment, as the entirety of the upper surface of the first housing 2 and the entirety of the upper surface of the second housing 3 can be used as mounting area for the structural components, the space of the housings 2 and 3 can be efficiently used. Thus, for example, when the size of the liquid crystal display device 4 is made larger, the visibility of the liquid crystal display device 4 can be improved, and when the size and the numbers of keys of the keyboard 5 are increased, the operability of the keyboard 5 can be improved.

The structure of the opening/closing device 10 which enables the above described operation of the first housing 2 and the second housing 3 is explained in detail.

As shown in FIG. 1, FIG. 2, and FIG. 8 to FIG. 12, the opening/closing device 10 mainly includes a pair of opening/closing mechanisms 11A and 11B, a base shaft 26 and the like. The pair of opening/closing mechanisms 11A and 11B are placed to be apart from each other in a Y1, Y2 direction.

As shown in FIG. 1 and FIG. 2, each of the opening/closing mechanisms 11A and 11B is configured to include a fixed plate 12, a movable plate 14, a fixed plate 16, a hinge arm 18, a slide arm 20, a backlash prevention mechanism 21, a link arm 22, a hinge unit 30 and the like.

The pair of opening/closing mechanism 11A and opening/closing mechanism 11B are configured to have the same structure except that the structures of the fixed plates 12 and 16 are different, the hinge arm 18 of the opening/closing mechanism 11A is provided with a bearing portion 18d, the hinge unit 30 is provided to the opening/closing mechanism 11B. Each of the structural components of the opening/closing mechanism 11A and each of the structural components of the opening/closing mechanism 11B are symmetrically provided in a left-right direction (Y1, Y2 direction) in FIG. 1 and FIG. 2.

Thus, in the following explanation, corresponding structures for the opening/closing mechanism 11A and the opening/closing mechanism 11B are provided with the same reference numerals and the explanation to which are described at the same time.

The fixed plates 12 and 16 are fixed to the first housing 2 of the electronic device 1. Specifically, as shown in FIG. 3, the fixed plates 12 and 16 are fixed at a mounting concave portions 2a formed in a first lower half body 2B of the first housing 2. The first housing 2 has a structure of a combination of a first upper half body 2A and the first lower half body 2B. Thus, the first housing 2 is configured to be integral with the fixed plates 12 and 16.

The fixed plates 12 and 16 are formed by pressing metal plate materials. As shown in FIG. 2, the fixed plate 12 includes a base portion 12a which is fixed to the first lower half body 2B (see FIG. 3) and standing portions 12b provided at both sides of the base portion 12a. The standing portion 12b at the outside (Y1 direction side) is provided with a pivot hole 12c to which a pivot shaft 19 is to be attached, and the standing portion 12b at the inner side (Y2 direction side) is provided with a pivot hole 12d which bears a bearing portion 18d of the hinge arm 18, which will be explained later.

The fixed plate 16 has a structure where a base portion 16a and a standing portion 16b are integrally formed. The base portion 16a is fixed to the first lower half body 2B (see FIG. 3). The standing portion 16b is provided with a pivot hole 16c to which a pivot shaft 19 is to be attached, which will be explained later.

The movable plates 14 are configured to be movable with respect to the fixed plates 12 and 16. The movable plates 14 are fixed to the second housing 3 of the electronic device 1. Specifically, as shown in FIG. 3, the movable plates 14 are fixed to mounting concave portions 3a of a second lower half body 3B of the second housing 3. The second housing 3 has a structure of a combination of a second upper half body 3A and the second lower half body 3B, and thus the second housing 3 is configured to be integral with the movable plates 14.

Figure 7:
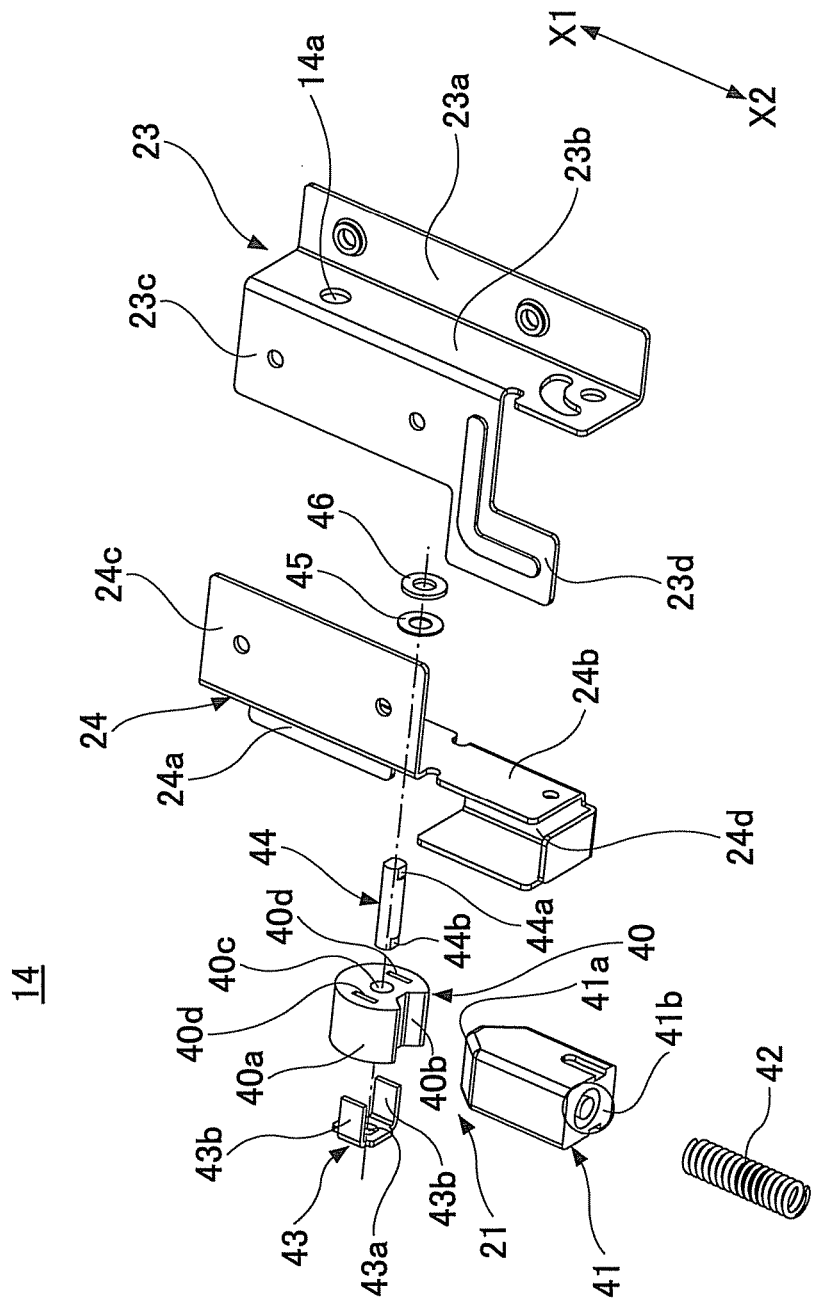
FIG. 7 is an exploded perspective view of a movable plate 14 which is incorporated in the opening/closing device of the embodiment.

As shown in FIG. 2, the movable plate 14 includes an inner plate 23 and an outer plate 24 obtained by pressing metal plate materials, respectively. In addition to FIGS. 1 and 2, as shown in FIG. 7, the inner plate 23 has a structure in which a base portion 23a, a standing portion 23b, a top plate portion 23c, and a cover portion 23d are integrally formed. The base portion 23a is fixed to the above described second lower half body 3B (see FIG. 3). The standing portion 23b is provided with a pivot hole 14a which bears a shaft portion 18a of the hinge arm 18, which will be explained later. The top plate portion 23c overlaps a top plate portion 24c of the outer plate 24 when the inner plate 23 and the outer plate 24 are combined to form the movable plate 14.

Figure 6:
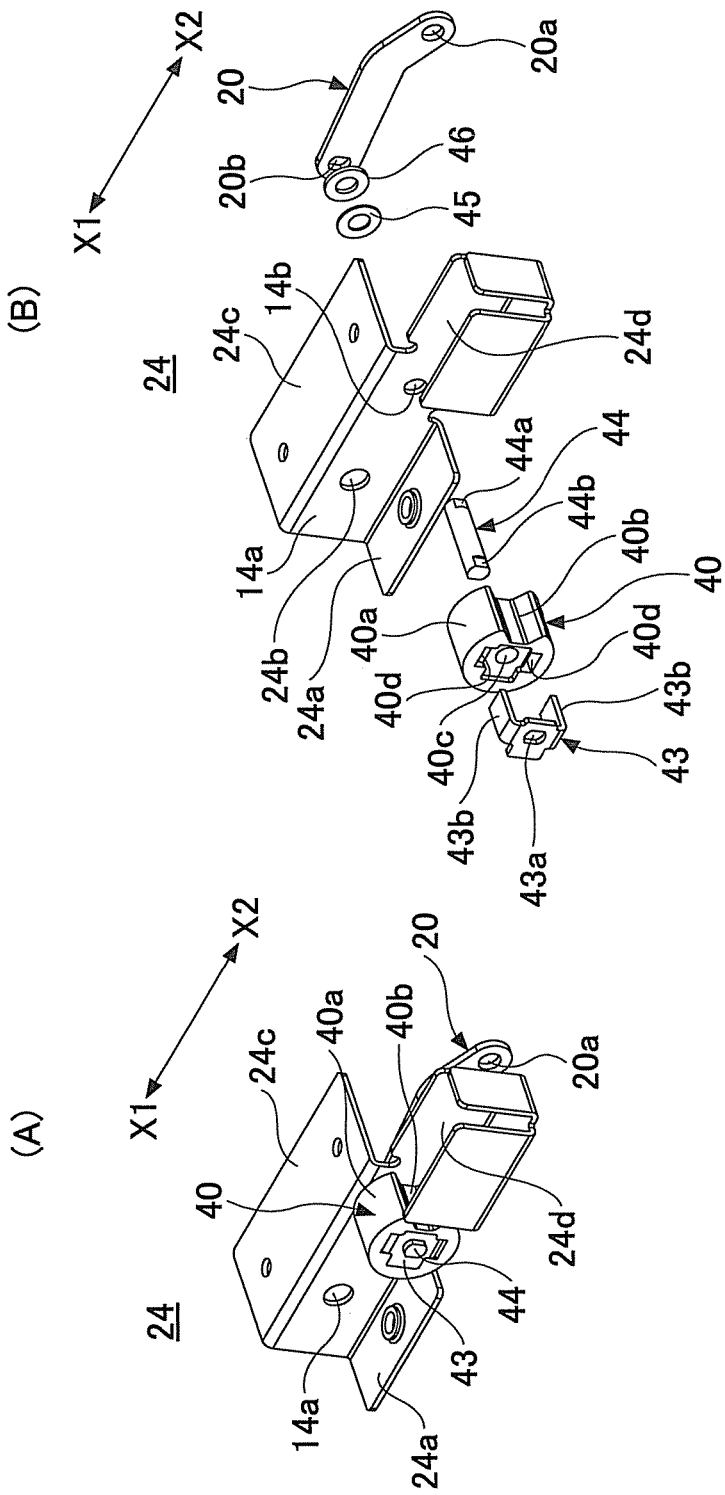
FIG. 6(A) is a perspective view showing a state in which a latch cam is attached to an outer plate and FIG. 6(B) is an exploded perspective view for explaining the attachment of the latch cam to the outer plate.

In addition to FIGS. 1 and 2, as shown in FIGS. 6 and 7, the outer plate 24 has a structure in which a base portion 24a, a standing portion 24b, the top plate portion 24c and a latch housing portion 24d are integrally formed. The base portion 24a is fixed to the second lower half body 3B (see FIG. 3). The standing portion 24b is provided with pivot holes 14a and 14b. The pivot hole 14a bears the shaft portion 18a of the hinge arm 18, which will be explained later. The pivot hole 14b bears a slide arm shaft 44 which is connected to the slide arm 20.

As described above, when the inner plate 23 is combined with the outer plate 24 to form the movable plate 14, the top plate portion 24c is overlapped with the top plate portion 23c of the inner plate 23. Then, at this overlapped state, the inner plate 23 and the outer plate 24 are integrally formed by welding the top plate portions 23c and 24c.

The latch housing portion 24d slidably houses a latch 41 which composes the backlash prevention mechanism 21, which will be explained later, in an X1, X2 direction. Further, an arm housing portion (space portion) inside of which the hinge arm 18 is housed in accordance with the rotation is formed at inner sides of plates 23 and 24 at a state where the inner plate 23 and the outer plate 24 are integrally formed.

In this embodiment, the movable plates 14 are placed to be separated in the Y1, Y2 direction. However, in the pair of the opening/closing mechanisms 11A and 11B, the top plate portion 23c or the top plate portion 24c composing either of the movable plates 14 may be formed to extend in the Y1, Y2 direction so that the left and right movable plates 14 are integrally formed to be a single structural component.

Figure 5:
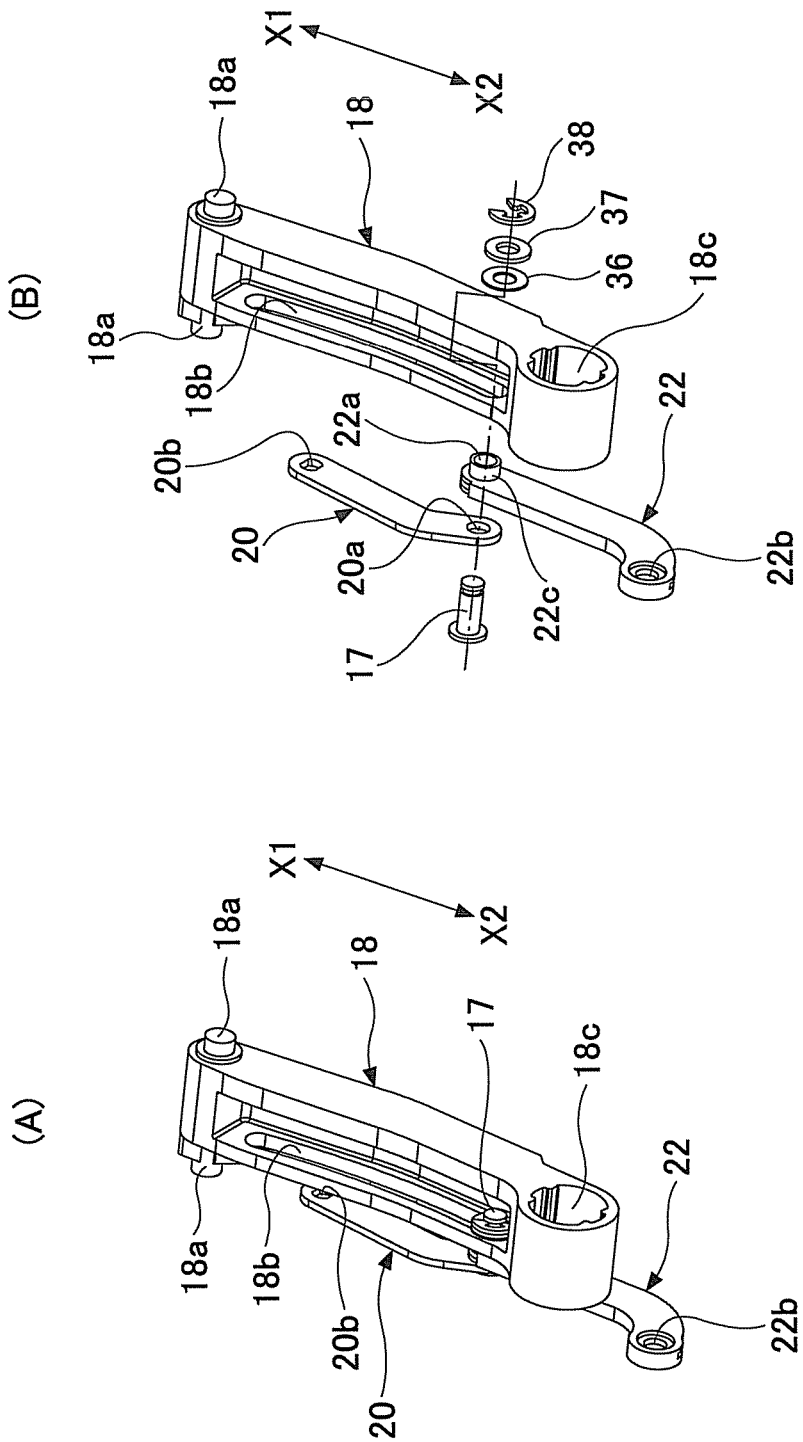
FIG. 5(A) is a perspective view showing a state in which a hinge arm, a slide arm, and a link arm are connected with each other.
FIG. 5(B) is an exploded perspective view for explaining the connection of the hinge arm, the slide arm, and the link arm.

As shown in FIG. 5, the hinge arm 18 is provided with the shaft portion 18a formed at an upper end portion, a pivot hole 18c formed at a lower end portion, and a slide hole 18b (long hole, slide groove) formed at a position between the shaft portion 18a and the pivot hole 18c.

The shaft portion 18a formed at the upper end portion of the hinge arm 18 is rotatably connected to the pivot hole 14a formed at the movable plate 14 as described above. Here, in the following explanation, a portion of the shaft portion 18a of the hinge arm 18 which is rotatably connected to the movable plate 14 is referred to as a "third axial portion A3".

Further, a base shaft 26 (corresponding to a connection arm) is attached to the pivot hole 18c formed at the lower end portion of the hinge arm 18. Specifically, the bearing portion 18d is formed at the hinge arm 18 positioned at the Y1 direction side in FIG. 2 and the pivot hole 18c is formed at the bearing portion 18d. An end portion of the base shaft 26 at the Y1 direction side is inserted into the pivot hole 18c of the bearing portion 18d and is fixed to the bearing portion 18d by a pin 29. With this structure, the hinge arm 18 at the Y1 direction side becomes a structure which integrally rotates with the base shaft 26.

On the other hand, the hinge arm 18 provided at the opening/closing mechanism 11B (positioned at an arrow Y2 direction) is configured such that a part of the structure of the hinge unit 30 is housed inside the pivot hole 18c formed at the lower end portion. Specifically, a head cam 31 and a hinge plate 35 composing the hinge unit 30 are housed inside the pivot hole 18c.

The head cam 31 and the hinge plate 35 are provided with protruding portions at outer peripheries and the hinge arm 18 is provided with a concave portion corresponding to the protruding portions within the pivot hole 18c. Thus, the head cam 31 and the hinge plate 35 integrally rotate with the hinge arm 18 at a state in which the head cam 31 and the hinge plate 35 are housed in the pivot hole 18c.

The hinge shaft 28 which composes the hinge unit 30 is provided at an end portion of the base shaft 26 at the Y2 direction side. Specifically, when the base shaft 26 is inserted in a holder portion 28b provided at the hinge shaft 28 and is fixed by the pin 29, the base shaft 26 and the hinge shaft 28 are configured to be integrally rotated. In the following, referring to the base shaft 26 means that the hinge shaft 28 is also included, except otherwise instructed.

The hinge shaft 28 is provided with an oval shaped portion 28a at an end portion in the Y2 direction. Further, the hinge plate 35 provided in the shaft portion 18a is provided with an oval shaped hole 35a having a shape corresponding to the oval shaped portion 28a. The oval shaped portion 28a is engaged into the oval shaped hole 35a of the hinge plate 35. With this structure, the hinge arm 18 integrally rotates with the base shaft 26 through the hinge plate 35 and the hinge shaft 28.

The hinge unit 30, which will be explained later, includes a hinge housing 34 fixed to the first lower half body 2B (see FIG. 3). The base shaft 26 is borne by the hinge housing 34. Thus, the base shaft 26 is borne by the fixed plate 12 and the hinge housing 34 which are fixed to the first lower half body 2B (first housing 2) on the first housing 2. Here, in the following explanation, a rotation axis of the rotation of the hinge arm 18 with respect to the fixed plates 12 and 16 is referred to as a "first axial portion A1".

Further, one end portions of the slide arm 20 and the link arm 22, respectively, are connected to the slide hole 18b formed between the shaft portion 18a and the pivot hole 18c of the hinge arm 18 as shown in FIG. 5 in an enlarged manner. The slide hole 18b is formed to extend in a longitudinal direction at an inner side surface of the hinge arm 18.

When connecting the slide arm 20 and the link arm 22 with the slide hole 18b, positions of a pivot hole 20a formed at a lower end portion of the slide arm 20 and a pivot hole 22a formed at an upper end portion of the link arm 22 are matched, and a pivot shaft 17 is inserted into each of the pivot holes 20a and 22a and the slide hole 18b. Then, an end portion of the pivot shaft 17 which protrudes inside from the slide hole 18b is inserted in a slider 36 and a spacer 37. Subsequently, an E washer 38 is fixed to the end portion of the pivot shaft 17. With this, the slide arm 20 and the link arm 22 are connected to the slide hole 18b.

As shown in (B) of FIG. 5, the link arm 22 is provided with a boss portion 22c which slidably engages the slide hole 18b. Thus, position of the slide hole 18b at which the slide arm 20 and the link arm 22 are connected is capable of moving along the slide hole 18b. In the following explanation, the portion at which the slide arm 20 and the link arm 22 is connected to the slide hole 18b of the hinge arm 18 (in other words, the position of the pivot shaft 17) is referred to as a "fifth axial portion A5".

The hinge arm 18 structured as described above has a function to move the movable plate 14 between the closed position and the opened position with respect to the fixed plates 12 and 16 by being rotated around the first axial portion A1 connected to the fixed plate 12 as a center. Further, when the movable plate 14 moves between the closed position and the opened position, the fifth axial portion A5 slides within the slide hole 18b.

As described above, the lower end portion of the slide arm 20 is connected to the fifth axial portion A5. Further, a slide arm shaft 44 is inserted into the pivot hole 20b formed at the upper end portion of the slide arm 20. The slide arm shaft 44 is rotatably borne by the pivot hole 14b formed at the movable plate 14 (see (B) of FIG. 6). Here, in the following explanation, a portion of the slide arm 20 which is rotatably connected to the movable plate 14 is referred to as a "fourth axial portion A4".

As shown in FIG. 2, the link arm 22 includes a combination of a link arm main body 22A and a link arm cover 22B. The link arm main body 22A is made of metal and the link arm cover 22B is made of resin. The link arm main body 22A is formed within the link arm cover 22B by an insert molding. With this structure, the strength of the link arm 22 can be actualized by the link arm main body 22A while smoothness at a surface of the link arm 22 can be actualized by the link arm cover 22B.

As described above, the pivot hole 22a formed at the upper end portion of the link arm 22 is rotatably connected to the slide hole 18b by the pivot shaft 17. The pivot hole 22b formed at the lower end portion of the link arm 22 is connected to the pivot hole 12c formed at the fixed plate 12 or the pivot hole 16c formed at the fixed plate 16 by the pivot shaft 19.

In the following explanation, the portion at which the lower end portion of the link arm 22 is connected to the fixed plate 12 or the fixed plate 16 is referred to as a "second axial portion A2". Thus, the upper end portion of the link arm 22 is rotatably connected to the fifth axial portion A5, and the lower end portion of the link arm 22 is rotatably connected to the second axial portion A2. Therefore, as the upper end portion of the link arm 22 is connected to the fifth axial portion A5, the link arm 22 is configured to be slidable along the slide hole 18b.

Next, the hinge unit 30 is explained. The hinge unit 30 includes the hinge shaft 28, the head cam 31, a slide cam 32, hinge springs 33a and 33b, the hinge housing 34, the hinge plate 35 and the like.

As described above, the hinge shaft 28 is connected to the base shaft 26. The hinge shaft 28 is inserted into the hinge housing 34 in the Y2 direction. The head cam 31, the slide cam 32 and the like are provided at a portion of the hinge shaft 28 which protrudes toward an inner side of the hinge housing 34.

The head cam 31 and the hinge plate 35 are provided within the pivot hole 18c of the hinge arm 18 (see FIG. 2). Here, as described above, the hinge arm 18, the base shaft 26, the hinge shaft 28, the head cam 31 and the hinge plate 35 are formed to be integrally rotated.

The slide cam 32 is provided with a projection portion at an outer periphery and the hinge housing 34 is also provided with a concave portion which engages the projection portion at inside. Thus, the rotation of the slide cam 32 with respect to the hinge housing 34 is regulated at a state in which the slide cam 32 is housed in the hinge housing 34. However, the pivot hole formed at the slide cam 32 has a diameter such that the hinge shaft 28 is rotatable therein. Thus, the base shaft 26 is rotatable with respect to the slide cam 32 as well as being slidable in an axis direction of the base shaft 26 (the arrow Y1, Y2 direction).

The hinge spring has a structure of a combination of the outer hinge spring 33a and the inner hinge spring 33b in this embodiment. The hinge springs 33a and 33b are configured such that one end portions are in contact with an inner wall of the hinge housing 34 and the other end portions are in contact with the slide cam 32. Thus, the elastic forces of the hinge springs 33a and 33b function as a force pushing the slide cam 32 toward the head cam 31.

In the above structured hinge unit 30, contacting surfaces of the head cam 31 and the slide cam 32 are provided with convexo-concave surfaces engaging with each other. A running torque is not generated at a position where the top portions of the convex surfaces of each of the cams 31 and 32 are in contact with each other (which is referred to as a "neutral position"). However, when the convex portion is shifted from the neutral position, a running torque is generated between each of the cams 31 and 32 by the elastic force of the hinge spring 33.

The hinge arm 18 moves between the closed position and the opened position, as described above and is set that an intermediate position of the closed position and the opened position becomes the neutral position of each of the cams 31 and 32, in this embodiment. Thus, when the hinge arm 18 is positioned between the closed position and the intermediate position, the hinge arm 18 is pushed to be rotated toward the closed position and when the hinge arm 18 is positioned between the intermediate position and the opened position, the hinge arm 18 is pushed to be rotated toward the opened position, by the hinge unit 30. Therefore, the above structured hinge unit 30 has a function of a so-called "cam type semiautomatic hinge".

Thus, when opening the movable plate 14 (second housing 3) with respect to the fixed plate (first housing 2), the movable plate 14 automatically moves toward the opened position after the movable plate 14 is operated to be open from the closed position to the neutral position. On the other hand, when closing the movable plate 14 with respect to the fixed plate 12, the movable plate 14 automatically moves toward the closed position after the movable plate 14 is operated to be closed from the opened position to the neutral position. As described above, by providing the semiautomatic hinge type hinge unit 30, the operability of the opening/closing device 10 (electronic device 1) can be improved.

The backlash prevention mechanism 21 is explained. As shown in FIGS. 6 and 7 in addition to FIG. 2, the backlash prevention mechanism 21 includes a slide arm 20, a latch cam 40, a latch 41 and the like. As shown in (A) of FIG. 14, the backlash prevention mechanism 21 has a function to prevent a generation of a movement (backlash) of the movable plate 14 in a direction shown by an arrow S shown in (B) of FIG. 14 after the movable plate 14 is moved to the opened position.

It means that when a force in a direction shown by an arrow D is applied to the movable plate 14 at a state shown in (A) of FIG. 14, there is a possibility that a rotational force around the third axial portion A3 as a center is generated in the movable plate 14, and backlash is generated to the movable plate 14 originated from a clearance between components or the like (see (B) of FIG. 14). At this time, the fourth axial portion A4 which is a connection position of the slide arm 20 and the movable plate 14 moves in the direction shown by the arrow S. The backlash prevention mechanism 21 has a function to prevent the generation of the backlash to the movable plate 14 as described above.

The latch cam 40 (see FIG. 6) has a substantially cylindrical shape. The latch cam 40 has a structure that a cam portion 40b is formed at a part of a circumference portion 40a. Further, the latch cam 40 is provided with a pivot hole 40c and an attachment hole 40d. The latch cam 40 is fixed to the slide arm shaft 44.

As described above, the slide arm shaft 44 is a shaft which is borne by the pivot hole 14b formed at the movable plate 14 (outer plate 24). Oval shaped portions 44a and 44b are formed at both end portions of the slide arm shaft 44.

The oval shaped portion 44a of the slide arm shaft 44 is connected to the slide arm 20. The pivot hole 20b formed at the upper end portion of the slide arm 20 has a shape corresponding to the shape of the oval shaped portion 44a. Thus, the oval shaped portion 44a is fastened to the pivot hole 20b so that the slide arm shaft 44 is integrally rotated with the slide arm 20.

Further, the other end portion of the slide arm shaft 44 is inserted into the pivot hole 40c of the latch cam 40. The latch plate 43 is attached to an outside surface of the latch cam 40. The latch plate 43 is provided with an oval shaped portion 43a and a pair of attachment arms 43b which are to be attached to the attachment hole 40d formed in the latch cam 40.

The oval shaped portion 43a is configured to correspond to the shape of the oval shaped portion 44b of the slide arm shaft 44. Thus, when the slide arm shaft 44 is inserted into the attachment hole 40d, the latch cam 40 integrally rotates with the slide arm shaft 44 as the slide arm shaft 44 is fastened to the oval shaped portion 43a of the latch plate 43 which is attached to the latch cam 40. Thus, the slide arm 20 and the latch cam 40 integrally rotate.

On the other hand, the latch 41 shown in FIG. 7 has a prism shape and provided with a protruding portion 41a at an end portion facing the latch cam 40. The protruding portion 41a has a shape to engage the cam portion 40b formed at the latch cam 40.

The latch 41 is attached in the latch housing portion 24d formed at the outer plate 24 with the latch spring 42. The latch 41 is provided with a spring receive portion 41b at an end portion in an X1 direction side and the latch spring 42 is attached to the spring receive portion 41b.

As described above, the outer plate 24 provided with the latch housing portion 24d structures the movable plate 14 by being welded with the inner plate 23. At this time, the cover portion 23d formed at the inner plate 23 covers an upper opening portion of the latch housing portion 24d at a state in which the inner plate 23 and the outer plate 24 are in combination. As such, by closing the upper opening portion of the latch housing portion 24d by the cover portion 23d, the latch 41 is prevented from being removed from the outer plate 24 (movable plate 14).

As described above, the latch cam 40 rotates in accordance with the rotation of the slide arm 20. Further, the latch 41 is configured to always push the protruding portion 41a in the direction (the X1 direction) toward the latch cam 40 by the spring force of the latch spring 42. As shown in (A) of FIG. 13, the latch cam 40 is rotatable so that the slide arm 20 is also rotatable at a state in which the protruding portion 41a of the latch 41 is pressed to be in contact the circumference portion 40a of the latch cam 40.

On the other hand, as shown in (B) of FIG. 13, at a state in which the protruding portion 41a engages the cam portion 40b, the rotation of the latch cam 40 (slide arm 20) is regulated by the latch 41. As explained with reference to (B) of FIG. 14, when backlash is generated at the movable plate 14, the fourth axial portion A4 to which the slide arm 20 is connected moves in the S direction. The backlash prevention mechanism 21 of the embodiment is configured not to generate the backlash in the movable plate 14 by regulating the movement of the slide arm 20 by the backlash prevention mechanism 21 at the opened position.

Specific operation of the electronic device 1 and the opening/closing device 10 as structured above is explained with reference to FIG. 8 to FIG. 12. FIG. 8 to FIG. 12 show an operation in which the second housing 3 and the movable plate 14 moves from the closed state to the opened state. In each of the drawings, (A) shows an operation of the electronic device 1, (B) shows an operation of the opening/closing device 10 to which the backlash prevention mechanism 21 is provided, and (C) shows an operation of the opening/closing device 10 from which the backlash prevention mechanism 21 is detached.

Figure 8:
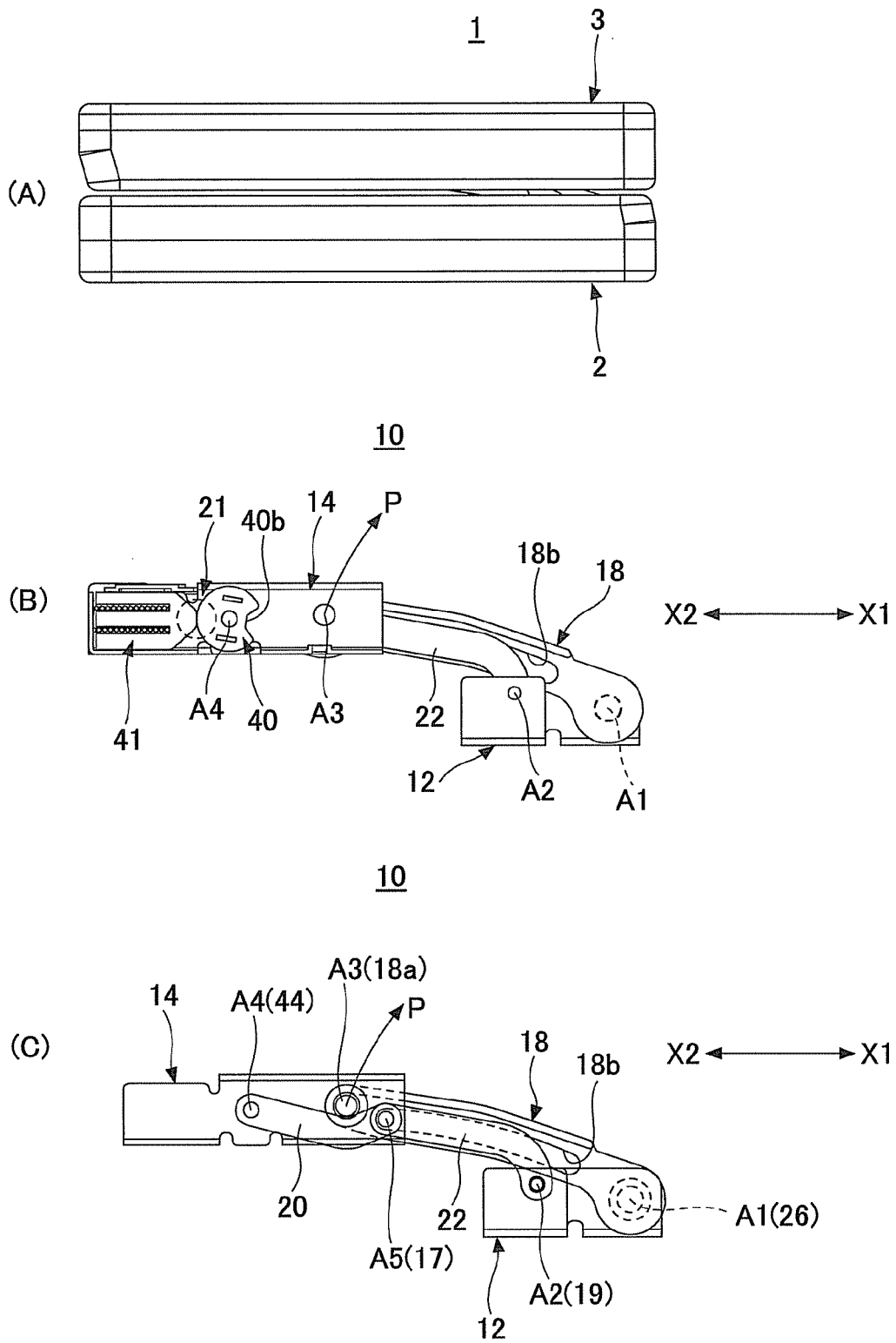
FIG. 8 is a schematic structure view for explaining an operation of the opening/closing device of the embodiment (part 1), where (A) is a side view of the electronic device, (B) is a side view of the opening/closing device to which a backlash prevention mechanism is attached, and (C) is a side view of the opening/closing device where the backlash prevention mechanism is detached.

FIG. 8 shows the electronic device 1 and the opening/closing device 10 at the closed state. At the closed state, as shown in (A) of FIG. 8, the second housing 3 of the electronic device 1 is overlapped above the first housing 2. Further, as shown in (B) and (C) of FIG. 8, at the closed state, the hinge arm 18 of the opening/closing device 10 is rotated in an anti-clockwise direction in the drawings around the first axial portion A1 as a center from an upright position.

Further at the closed state, the fifth axial portion A5 is positioned at an end portion within the slide hole 18b at a third axial portion A3 side (an end portion closer to the movable plate 14). The hinge arm 18, the slide arm 20, and the link arm 22 are aligned on a substantial line to be at a compact state.

Further, the hinge unit 30 (see FIG. 1) pushes the hinge arm 18 in an anti-clockwise direction in the drawing with having the first axial portion A1 as a center at the closed state. Further, at the backlash prevention mechanism 21, as shown in (B) of FIG. 8, the latch 41 is pressed to be in contact with the circumference portion 40a of the latch cam 40. Thus, the slide arm 20 is at a rotatable state.

Figure 9:
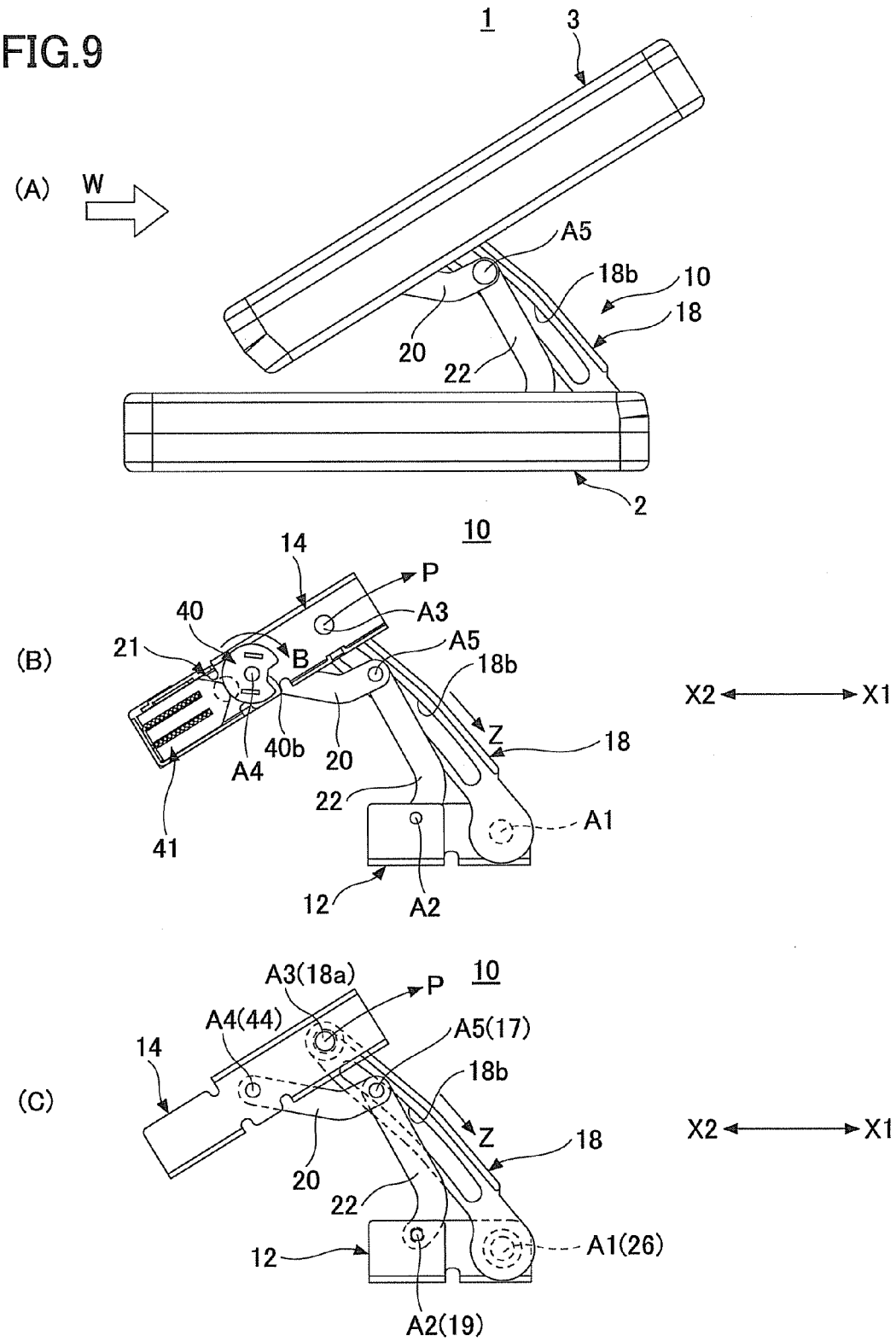
FIG. 9 is a schematic structure view for explaining the operation of the opening/closing device of the embodiment (part 2), where (A) is a side view of the electronic device, (B) is a side view of the opening/closing device to which the backlash prevention mechanism is attached, and (C) is a side view of the opening/closing device where the backlash prevention mechanism is detached.

When the second housing 3 is operated to be moved toward the opened position against the energizing force of the hinge unit 30 from the closed state, the second housing 3 is apart from the first housing 2 to be moved toward the opened position as shown in (A) of FIG. 9. In accordance with this, the hinge arm 18 is started to be rotated in the direction shown by the arrow P in (B) of FIG. 9 around the first axial portion A1 as a center, and with this rotation, the slide arm 20 and the link arm 22 are started to rotate around each of the axial portions A2, A3, A4 and A5 as centers, respectively. With this, the movable plate 14 is started to be moved from the closed position.

At this time, the lower end portion of the slide arm 20 and the upper end portion of the link arm 22 are connected to the fifth axial portion A5 which is movably engaged with the hinge arm 18. Thus, when the hinge arm 18 is rotated in the P direction, the slide arm 20 and the link arm 22 move the fifth axial portion A5 in a direction directing toward the first axial portion A1 along the slide hole 18b (the direction shown by an arrow Z in the drawings). As such, as the fifth axial portion A5 moves along the slide hole 18b, each of the arms 18, 20 and 22 can be smoothly rotated.

At this movement, the movable plate 14 is supported by the slide arm 20 with respect to the hinge arm 18, and the hinge arm 18 is supported by the link arm 22 with respect to the fixed plate 12 and the hinge housing 34. Thus, the moving posture of the movable plate 14 is stabilized so that the movable plate 14 does not unnecessarily move with respect to the hinge arm 18.

FIG. 10 shows a state in which the second housing 3 (movable plate 14) is moved to the neutral position. In this embodiment, the position at which the hinge arm 18 is set at an upright position from the closed state is the neutral position.

As described above, at the neutral position, the top portion of each of the convex surfaces of the head cam 31 and the slide cam 32 of the hinge unit 30 is in contact with each other. At this neutral position, the rotational energizing force of the hinge arm 18 by the hinge unit 30 momentarily disappears. Then, by operating the second housing 3 (movable plate 14) toward the opened position from the neutral position, the running torque generated between the contacting surfaces of the head cam 31 and the slide cam 32 are reversed so that the base shaft 26 is pushed to be rotated in a direction that the movable plate 14 is moved toward the opened position.

With this structure, after the neutral position, the hinge arm 18 is pushed to be rotated in a clockwise direction (opening direction) around the first axial portion A1 as a center. Thus, after the second housing 3 (movable plate 14) is slightly operated toward the opened position from the neutral position, the second housing 3 (movable plate 14) is automatically moved toward the opened position as shown in FIG. 11 to FIG. 12.

Further, even at the neutral position, as shown in (B) of FIG. 10, the latch 41 of the backlash prevention mechanism 21 is pushed to be in contact with the circumference portion 40a of the latch cam 40 and the rotation of the slide arm 20 is enabled.

FIG. 11 shows a state in which the hinge arm 18 is further rotated from the neutral position to be in the vicinity of the opened position. After passing the neutral position, the hinge arm 18 functions to push the third axial portion A3 downward. Thus, as shown in FIG. 11, in accordance with the rotation of the hinge arm 18 in the P direction, the angle of the second housing 3 (movable plate 14) with respect to a horizontal direction (tilt angle θ) gradually decreases. It means that the posture of the second housing 3 (movable plate 14) becomes close to be extended in the horizontal direction.

Figure 12:
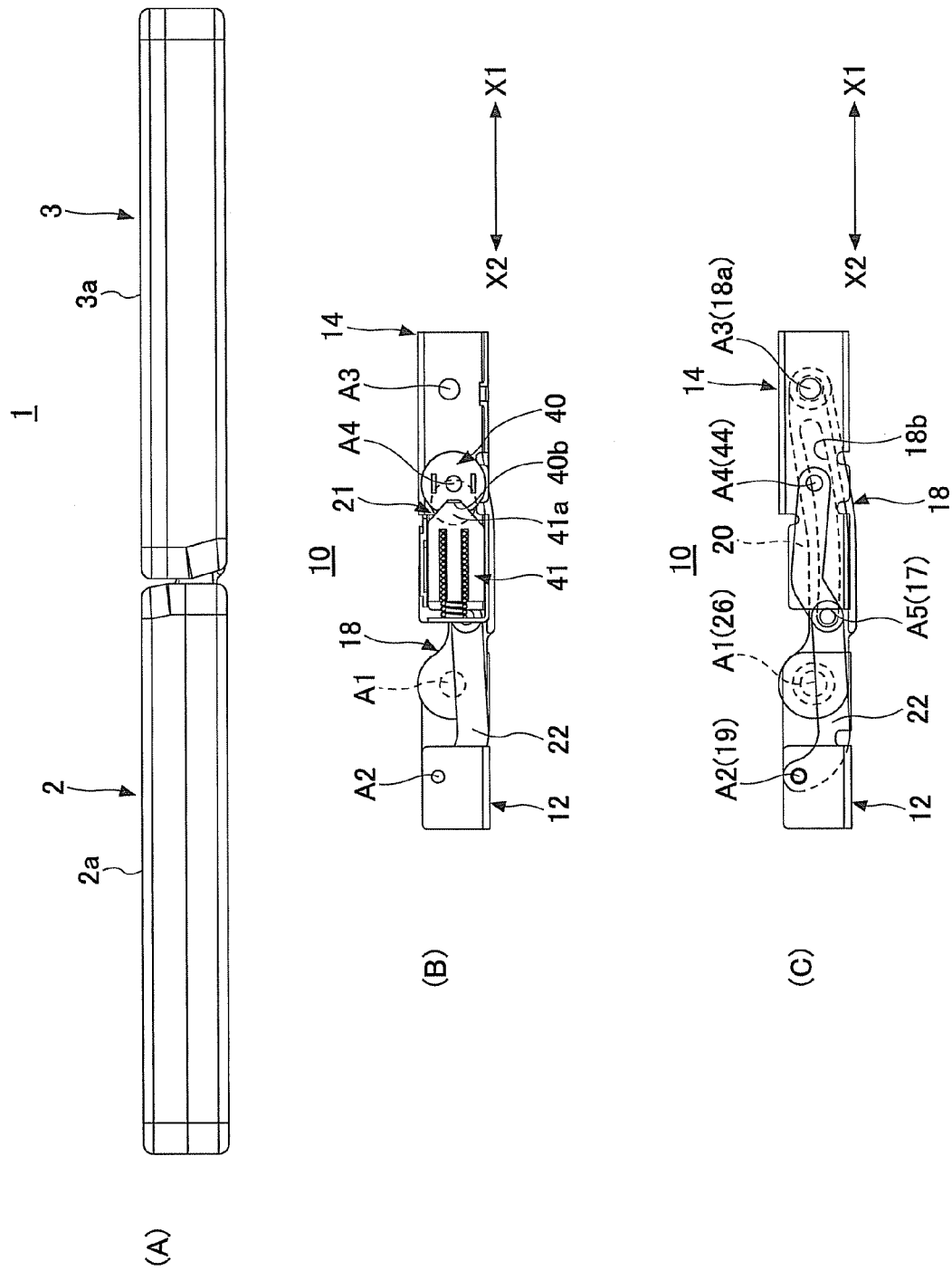
FIG. 12 is a schematic structure view for explaining the operation of the opening/closing device of the embodiment (part 5), where (A) is a side view of the electronic device, (B) is a side view of the opening/closing device to which the backlash prevention mechanism is attached, and (C) is a side view of the opening/closing device where the backlash prevention mechanism is detached.

Then, as shown in FIG. 12, when the second housing 3 (movable plate 14) is moved to the opened position, the upper surface of the first housing 2 and the upper surface of the second housing 3 become located within the same plane. At this opened state, the arms 18, 20 and 22 are aligned on a line, and the arms 18, 20 and 22 are overlapped in the axis direction of the base shaft (Y1, Y2 direction). Thus, the opening/closing device 10 is at a compact state even at the opened state.

Further, at the backlash prevention mechanism 21, the protruding portion 41a of the latch 41 engages the cam portion 40b of the latch cam 40 when the movable plate 14 is moved to the opened position. Thus, the rotation of the slide arm 20 is regulated by the backlash prevention mechanism 21 at a state where the movable plate 14 is moved to the opened position. With this, as explained above with reference to FIG. 14, the generation of the backlash originated from the movement of the fourth axial portion A4 of the movable plate 14 in the direction shown by the arrow S can be prevented. Therefore, shaking or backlash of the second housing 3 at the opened state can be prevented and the usability of the electronic device 1 can be improved.

The operation and the movement of the second housing 3 (movable plate 14) from the opened state shown in FIG. 13 to the closed position are opposite from those explained above with reference to FIG. 8 to FIG. 13, and the explanation to which is omitted.

As described above, the opening/closing device 10 of the embodiment is capable of retaining the movable plate 14 and the fixed plate 12 at substantially the same plane at the opened position with a simple mechanism. Further, one end of the slide arm 20 is connected to the movable plate 14 at the fourth axial portion A4 and the other end of the slide arm 20 is connected to the fifth axial portion A5. Further, one end of the link arm 22 is connected to the fixed plate 12 or the fixed plate 16 at the second axial portion A2 and the other end of the link arm 22 is connected to the fifth axial portion A5. Further, the fifth axial portion A5 is slidably provided to the slide hole 18b formed at the hinge arm 18. Thus, the operations of the arms 18, 20 and 22 are synchronized so that the second housing 3

(movable plate 14) can be smoothly moved between the closed position and the opened position by a single operation.

Further, in the opening/closing device 10 of the embodiment, as described above, as the lower end portion of the slide arm 20 and the upper end portion of the link arm 22 are connected to the fifth axial portion A5 and the fifth axial portion A5 is configured to be slidable within the slide hole 18*b*, the slide arm 20 and the link arm 22 can be positioned closer to the hinge arm 18. Therefore, at the movement of the movable plate 14 from the closed position to the opened position as shown in FIG. 8 to FIG. 12, the open and close operation can be performed under a state in which the arms 18, 20 and 22 are overlapped in the Y1, Y2 direction, or the slide arm 20 and the link arm 22 are in the vicinity of the hinge arm 18.

With this, the volume of the opening/closing device 10 within the electronic device 1 can be decreased to efficiently use the first housing 2 and second housing 3. Further, it is possible to prevent contamination to be included in each of the arms 18, 20 and 22 during the open and close operation of the moving the opening/closing device 10 to improve the reliability of the opening/closing device 10.

Next, an alternative example of the opening/closing device 10 of the embodiment is explained.

Figure 15:
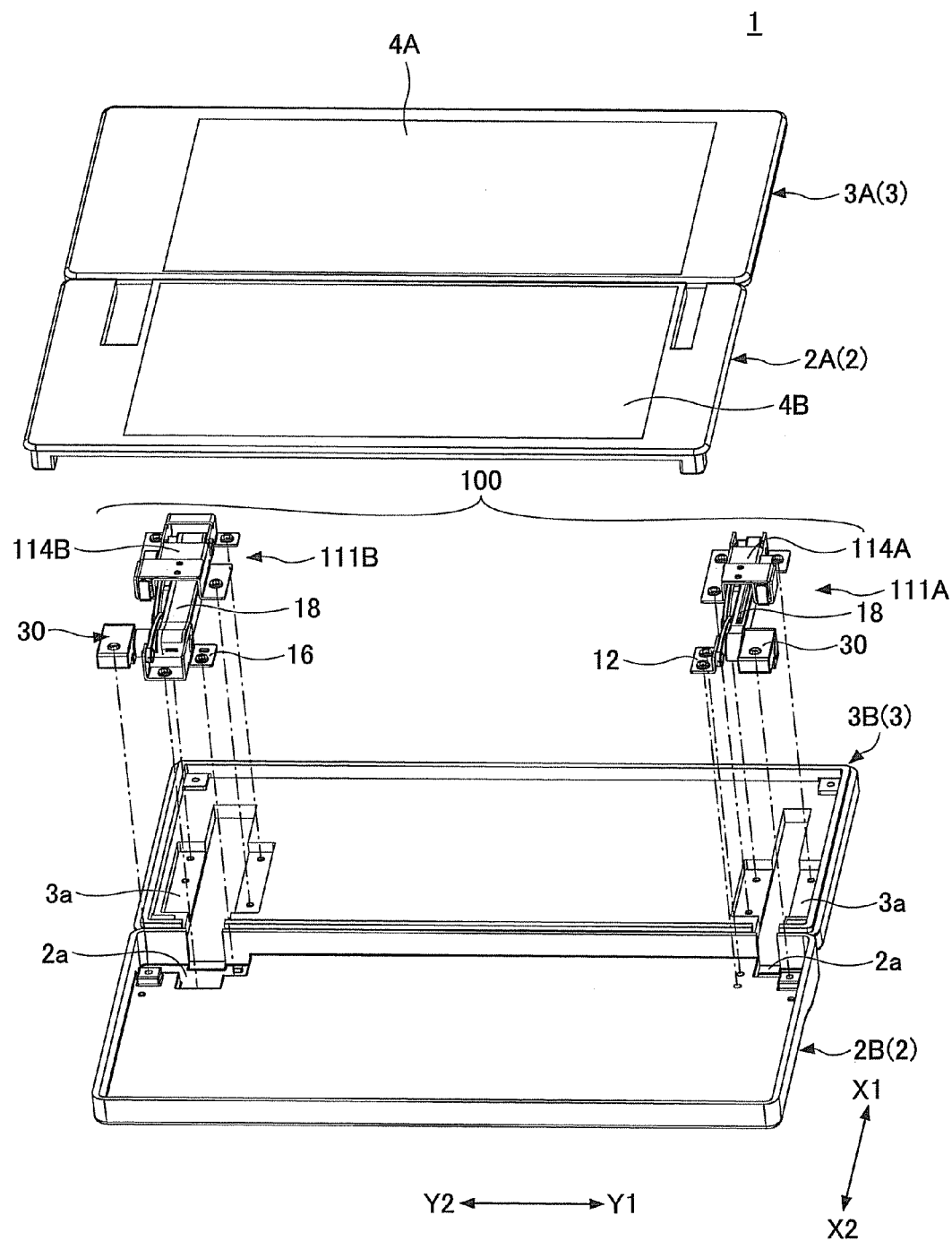
FIG. 15 is an exploded perspective view for explaining the attachment of the opening/closing device of the alternative example of the embodiment to the electronic device.
Figure 16:
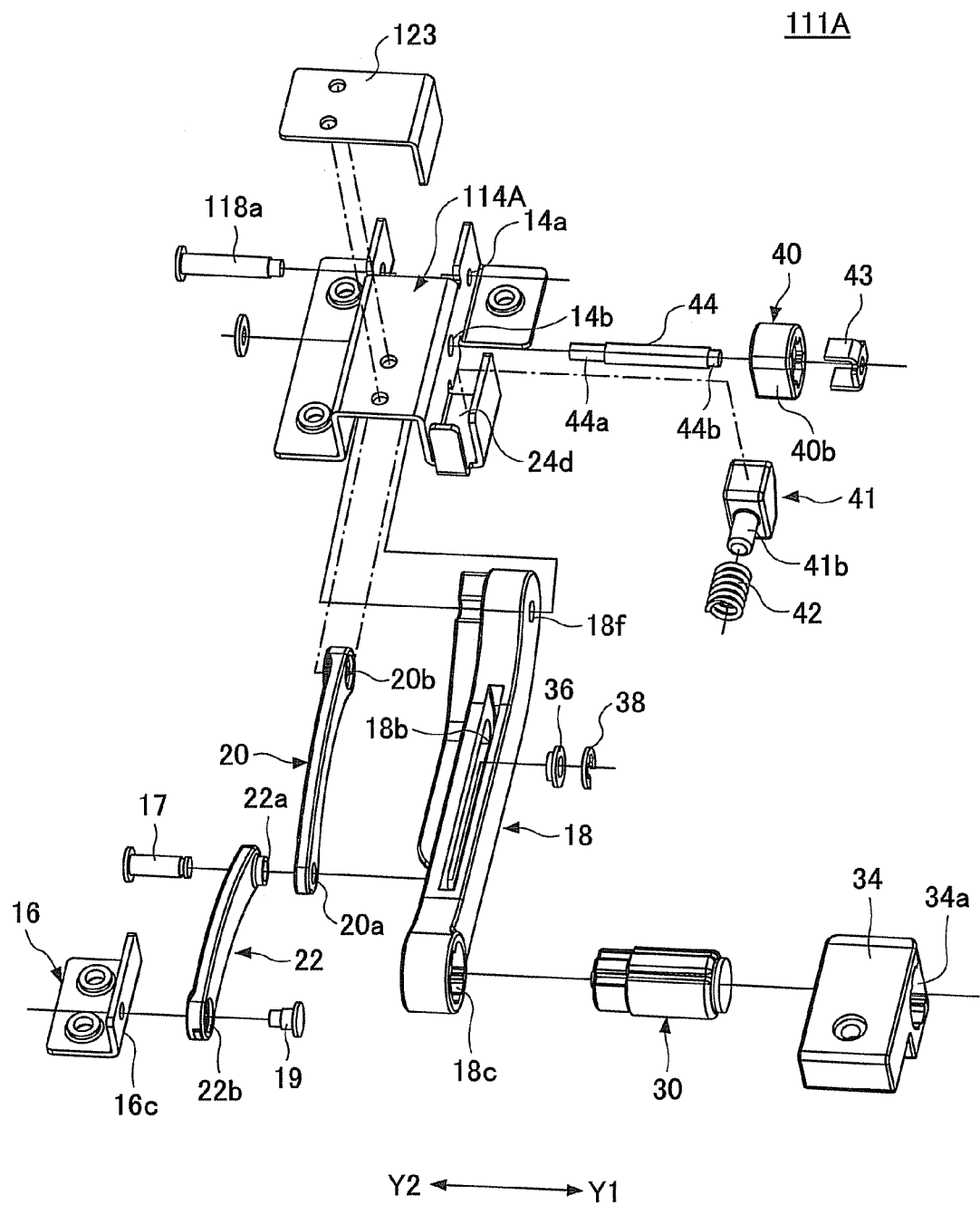
FIG. 16 is an enlarged exploded perspective view showing a vicinity of the hinge arm positioned at right side in FIG. 15.
Figure 17:
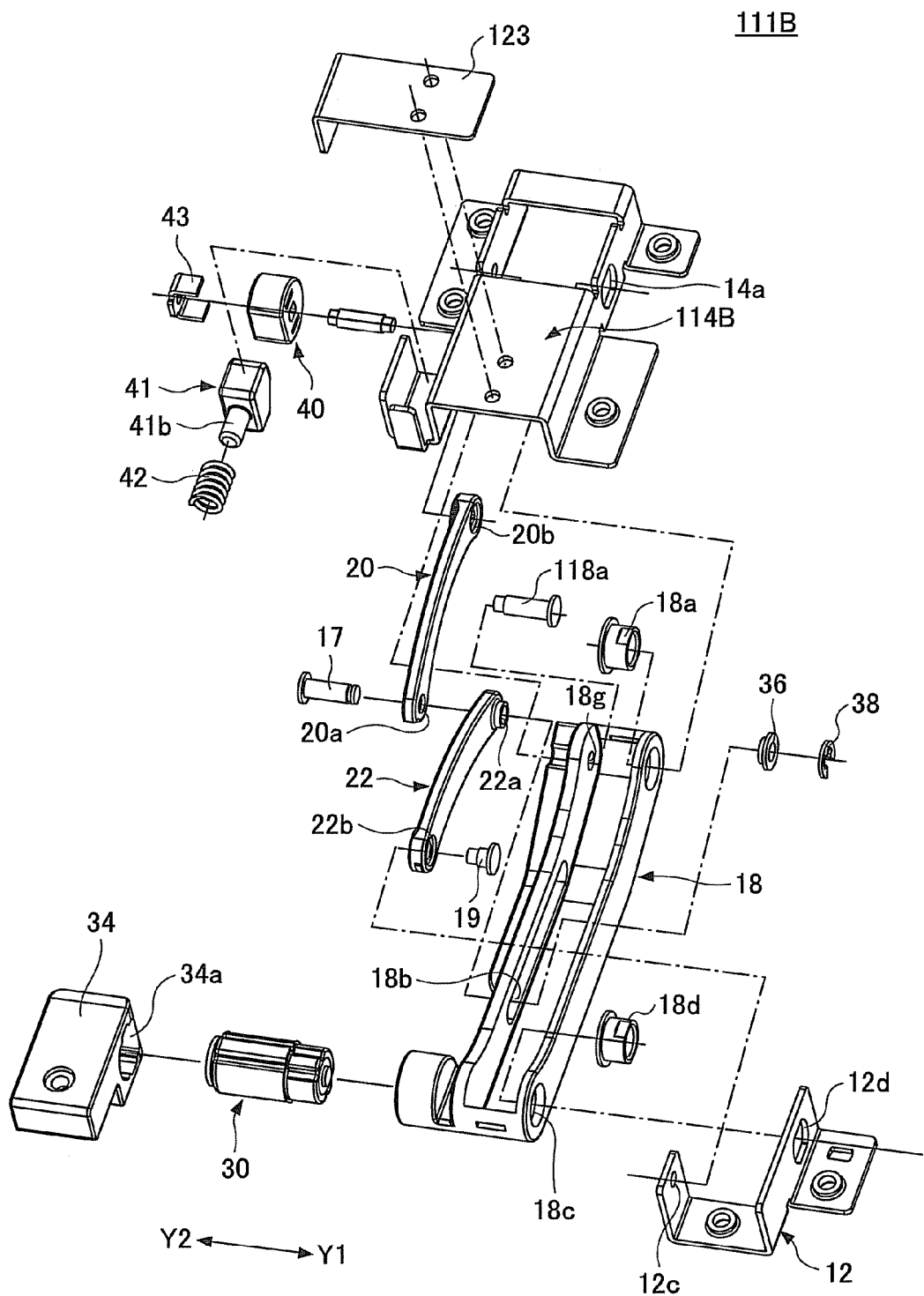
FIG. 17 is an enlarged exploded perspective view showing the hinge arm positioned at left side in FIG. 15.

FIG. 15 to FIG. 19 are views for explaining an opening/closing device 100, which is an alternative example of the opening/closing device 10. FIG. 15 shows the electronic device 1 to which the opening/closing device 100 of the example is provided. FIG. 16 is an enlarged exploded perspective view of an opening/closing mechanism 111A provided at the Y1 direction side, and FIG. 17 is an enlarged exploded perspective view of an opening/closing mechanism 111B provided at the Y2 direction side. FIG. 18 shows the operation of the opening/closing mechanism 111A, where (A) shows the closed state and (B) shows the opened state. Further, FIG. 19 shows the operation of the opening/closing mechanism 111B, where (A) shows the closed state and (B) shows the opened state.

The opening/closing device 100 of the embodiment has substantially the same structure as the opening/closing device 10 explained with reference to FIG. 1 to FIG. 14 except that the base shaft 26 provided in the opening/closing device 10 is removed, and the hinge unit 30 is provided to each of the pair of the opening/closing mechanisms 111A and 111B.

Thus, for the opening/closing device 100, which is an alternative example of the opening/closing device 10, the same components corresponding to the components of the opening/closing device 10 shown in FIG. 1 to FIG. 14 are given the same reference numerals and explanations are not repeated. Further, for the opening/closing device 100 of the example, the structure different from that of the opening/closing device 10 is mainly explained.

As shown in FIG. 15, the electronic device 1 to which the opening/closing device 100 of the example is provided has a structure in which a liquid crystal display device 4A is provided to a second upper half body 3A and a liquid crystal display device 4B is provided to a first upper half body 2A. Further in this example as well, the pair of opening/closing mechanisms 111A and 111B are provided to be apart from each other in the Y1, Y2 direction.

Here, the opening/closing device 10 shown in FIG. 3 and the opening/closing device 100 shown in FIG. 15 are compared. In the opening/closing device 10 shown in FIG. 3, the base shaft 26 is provided between the opening/closing mechanism 11A and the opening/closing mechanism 11B and the opening/closing mechanisms 11A and 11B are connected.

On the other hand, in the opening/closing device 100 of the example, the opening/closing mechanism 111A and the opening/closing mechanism 111B are independently provided and a base shaft is not provided between the opening/closing mechanisms 111A and 111B. When the base shaft is not used as in this example, it is possible to provide more space for mounting components to be mounted on the first housing 2.

Specifically, when mounting the liquid crystal display device 4B on the first housing 2 as in this alternative example, as the liquid crystal display device 4B has a certain thickness, if the opening/closing device 10 including the base shaft 26 as shown in FIG. 3 is used, the liquid crystal display device cannot be provided at a position where the base shaft 26 is provided.

On the other hand, according to the opening/closing device 100 of the example, as the base shaft is not provided, components such as the liquid crystal display device or the like can be provided between the opening/closing mechanism 111A and the opening/closing mechanism 111B. Thus, according to the opening/closing device 100 of the example, when the liquid crystal display device 4B is mounted on the first housing 2, the liquid crystal display device 4B can be provided between the opening/closing mechanism 111A and the opening/closing mechanism 111B so that the liquid crystal display device 4A can be provided to be closer to an longitudinal end at the X1 direction of the first lower half body 2B.

With this structure, when the second housing 3 is opened with respect to the first housing 2, as shown in FIG. 15, the liquid crystal display device 4B provided at the first upper half body 2A (first housing 2) can be provided extremely close to the liquid crystal display device 4A provided at the second upper half body 3A. Therefore, the two liquid crystal display devices 4A and 4B appear to be as if a single liquid crystal display panel so that the visibilities of the liquid crystal display devices 4A and 4B can be improved.

Further when providing components other than the liquid crystal display device between the opening/closing mechanism 111A and the opening/closing mechanism 111B, the space corresponding to the provided components can be reduced, and thus, with this structure, the electronic device 1 can be made smaller.

Further, in the opening/closing device 100 of the example, the hinge units 30 are provided for the opening/closing mechanisms 111A and 111B, respectively as the opening/closing mechanisms 111A and 111B are independently provided. The hinge units 30 are configured to have the same structure as that attached to the opening/closing mechanism 11B at the Y2 direction side of the opening/closing device 10.

When the opening/closing mechanism 111A and the opening/closing mechanism 111B are independently provided, as shown in (A) and (B) of FIG. 18, the opening/closing mechanism 111A is capable of rotating the hinge arm 18 in the direction shown by arrows P1 and P2 with respect to the fixed plate 16 regardless of the opening/closing mechanism 111B. Similarly, as shown in (A) and (B) of FIG. 19, opening/closing mechanism 111B is capable of rotating the hinge arm 18 in the direction shown by the arrows P1 and P2 with respect to the fixed plate 12 regardless of the opening/closing mechanism 111A.

At this structure in which the opening/closing mechanisms 111A and 111B are independently provided, if the hinge unit 30 is provided only to one of the opening/closing mechanism, as the base shaft does not exist, when the open and close operation is performed for the second housing 3 with respect to the first housing 2, the running torque of the hinge unit 30 is applied only to the one of opening/closing mechanism. With this structure, the running torque of the hinge unit 30 is applied to the first housing 2 and/or second housing 3 at a biased condition and there is a possibility that a stable open and close operation cannot be performed. However, according to the opening/closing device 100 of the example, as the hinge units 30 are respectively provided to the opening/closing mechanisms 111A and 111B, the open and close operation is stably performed even when each of the opening/closing mechanisms 111A and 111B are independently provided.

Further, in this example, the hinge units 30 are provided outside the opening/closing mechanisms 111A and 111B. It means that the hinge unit 30 is provided at the Y1 direction side of the hinge arm 18 in the opening/closing mechanism 111A while the hinge unit 30 is provided at the Y2 direction side of the hinge arm 18 in the opening/closing mechanism 111B. With this structure, as the hinge units 30 are not provided between the pair of the opening/closing mechanisms 111A and 111B, the above described liquid crystal display device or components can be arbitrary placed.

Further, the difference between the opening/closing device 100 of the example and the opening/closing device 10 is that the movable plate 14 is composed by a combination of the inner plate 23 and the outer plate 24 in the opening/closing device 10, while the movable plates 114A and 114B are respectively integrally formed by pressing in this alternative example. Further, in this alternative example, a top plate 123 which covers the latch housing portion 24d is independently provided and the top plate 123 is fixed to the movable plate 114A or 114B by a screw, not shown in the drawings. According to the structure of this alternative example, the movable plates 114A and 114B are respectively integrally formed to improve assembling.

Although there are other differences between the opening/closing device 10 and the opening/closing device 100, such differences are from design purposes and the explanation is omitted.

Although a preferred embodiment has been specifically illustrated and described, it is to be understood that minor modifications may be made therein without departing from the spirit and scope of the invention as defined by the claims.

The present application is based on and claims the benefit of priority of Japanese Priority Application No. 2010-203383 filed on Sep. 10, 2010, and Japanese Priority Application No. 2011-094892 filed on Apr. 21, 2011, the entire contents of which are hereby incorporated by reference.

REFERENCE NUMERALS 1 electronic device
2 first housing
3 second housing
10, 100 opening/closing device
11A, 11B, 111A, 111B opening/closing mechanism
12, 16, 112, 116 fixed plate
14, 114A, 114E movable plate
16 fixed plate
18 hinge arm
20 slide arm
22 link arm
23 inner plate
24 outer plate
26 base shaft
30 hinge unit
31 head cam
32 slide cam
33a, 33b hinge spring
34 hinge housing
35 hinge plate
40 latch cam
40b cam groove
41 latch
41a protruding portion
42 latch spring
43 latch plate
44 slide arm shaft

What is claimed is:

1. An opening/closing device comprising:
an opening/closing mechanism which moves a movable plate between an opened position and a closed position with respect to a fixed plate,
the opening/closing mechanism including
a hinge arm that is rotatably connected to the fixed plate at a first axis, rotatably connected to the movable plate at a third axis, and provided with a slide groove provided between the first axis and the third axis,
the hinge arm being capable of moving the movable plate between the closed position and the opened position with respect to the fixed plate by being rotated around the first axis as a center,
a link arm that is rotatably connected to the fixed plate at a second axis and rotatably and slidably connected to the hinge arm at a fifth axis,
the fifth axis being provided in the slide groove to be slid along the slide groove of the hinge arm, and
a slide arm that is rotatably connected to the movable plate at a fourth axis,
the slide arm being connected to the link arm at the fifth axis such that the slide arm is rotatably and slidably connected to the hinge arm, and
wherein when the movable plate is moved between the closed position and the opened position, the fifth axis is slid in the slide groove in accordance with rotations of the hinge arm and the link arm, and surfaces of the first housing and the second housing are positioned at substantially the same plane when the movable plate is moved to the opened position.

2. The opening/closing device according to claim 1, further comprising a backlash prevention mechanism which regulates the rotation of the slide arm at the fourth axis when the movable plate is moved to the opened position.

3. The opening/closing device according to claim 2, wherein
the backlash prevention mechanism includes a latch cam which is coaxially provided with the fourth axis and integrally rotates with the slide arm, and a latch which is pressed to be in contact with the latch cam, and
the latch engages a cam groove provided at the latch cam to regulate the rotation of the slide arm when the movable plate is moved to the opened position.

4. The opening/closing device according to claim 1, wherein
a pair of the opening/closing mechanisms are provided to be apart from each other,
the link arms provided to the pair of the opening/closing mechanisms are connected by a connection arm at the first axis, respectively, and
the link arms provided to the pair of the opening/closing mechanisms are synchronously rotated.

5. The opening/closing device according to claim 4, wherein a hinge unit which generates a torque is provided at the first axis of one of the pair of the opening/closing mechanisms.

6. The opening/closing device according to claim 1, wherein
- a pair of the opening/closing mechanisms are independently provided to be apart from each other, and
- a hinge unit which generates a torque is provided at the first axis of each of the pair of the opening/closing mechanisms.

7. The opening/closing device according to claim 1,
- wherein the link arm and the slide arm are provided at the same side with respect to the hinge arm.

8. The opening/closing device according to claim 1,
- wherein the link arm and slide arm are rotatable around the fifth axis.

* * * * *